(12) United States Patent
Nevitt et al.

(10) Patent No.: US 8,926,159 B2
(45) Date of Patent: *Jan. 6, 2015

(54) THIN HOLLOW BACKLIGHTS WITH BENEFICIAL DESIGN CHARACTERISTICS

(71) Applicant: 3M Innovative Properties Company, St. Paul, MN (US)

(72) Inventors: Timothy J. Nevitt, Red Wing, MN (US); Timothy J. Hebrink, Scandia, MN (US); Michael F. Weber, Shoreview, MN (US); Rolf W. Biernath, Wyoming, MN (US); David G. Freier, St. Paul, MN (US); John A. Wheatley, Lake Elmo, MN (US); Andrew J. Ouderkirk, St. Paul, MN (US); Charles D. Hoyle, Stillwater, MN (US); Kristopher J. Derks, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,016

(22) Filed: Jul. 9, 2013

(65) Prior Publication Data

US 2014/0009963 A1 Jan. 9, 2014

Related U.S. Application Data

(63) Continuation of application No. 12/600,862, filed as application No. PCT/US2008/064096 on May 19, 2008, now Pat. No. 8,523,419.

(60) Provisional application No. 60/939,084, filed on May 20, 2007.

(51) Int. Cl.
*F21V 7/04* (2006.01)
*F21V 8/00* (2006.01)
*G02F 1/1335* (2006.01)

(52) U.S. Cl.
CPC ............... *F21V 7/04* (2013.01); *G02B 6/0068* (2013.01); *G02B 6/0096* (2013.01); *G02F 1/133603* (2013.01); *G02B 6/0055* (2013.01); *G02B 6/0056* (2013.01); *G02F 1/133605* (2013.01); *G02F 1/13362* (2013.01)
USPC ............ 362/613; 362/301; 362/346; 362/612

(58) Field of Classification Search
USPC .................... 362/97.1–97.4, 249.02, 296.01, 362/297–298, 301, 341, 346, 600–634, 362/800; 349/61–62, 67
See application file for complete search history.

(56) References Cited

U.S. PATENT DOCUMENTS

| 3,610,729 A | 10/1971 | Rogers |
| 3,711,176 A | 1/1973 | Alfrey, Jr. |

(Continued)

FOREIGN PATENT DOCUMENTS

| DE | 199 61 491 | 12/2000 |
| EP | 0 426 397 | 5/1991 |

(Continued)

OTHER PUBLICATIONS

3M Diffusing Film Alternative (DFA), Maximum uniformity and efficiency in flat panel displays, Brochure, 2 pages, 1996.

(Continued)

*Primary Examiner* — Jason Moon Han
(74) *Attorney, Agent, or Firm* — Lisa P. Fulton

(57) ABSTRACT

A front and back reflector are arranged to form a hollow light recycling cavity having an output region, and one or more light sources (e.g. LEDs) are disposed to emit light into the cavity. In one aspect, the back reflector has a design characterized by a first and second parameter. The first design parameter is a ratio of the collective emitting area of the light sources Aemit to the area of the output region Aout, and Aemit/Aout is preferably from 0.0001 to 0.1. The second design parameter is SEP/H, where H is the depth of the recycling cavity, and SEP is an average plan view source separation associated with the light sources. Other aspects of the disclosed extended area light sources are also described.

17 Claims, 7 Drawing Sheets

(56) References Cited

U.S. PATENT DOCUMENTS

| | | |
|---|---|---|
| 3,773,882 A | 11/1973 | Schrenk |
| 3,884,606 A | 5/1975 | Schrenk |
| 4,040,727 A | 8/1977 | Ketchpel |
| 4,446,305 A | 5/1984 | Rogers |
| 4,456,336 A | 6/1984 | Chung |
| 4,540,623 A | 9/1985 | Im |
| 4,791,540 A | 12/1988 | Dreyer |
| 5,103,337 A | 4/1992 | Schrenk |
| 5,126,880 A | 6/1992 | Wheatley |
| 5,136,479 A | 8/1992 | Ruffner |
| 5,337,068 A | 8/1994 | Stewart |
| 5,360,659 A | 11/1994 | Arends |
| 5,381,309 A | 1/1995 | Borchardt |
| 5,440,197 A | 8/1995 | Gleckman |
| 5,448,404 A | 9/1995 | Schrenk |
| 5,453,855 A | 9/1995 | Nakamura |
| 5,568,316 A | 10/1996 | Schrenk |
| 5,594,830 A | 1/1997 | Winston |
| 5,751,388 A | 5/1998 | Larson |
| 5,771,328 A | 6/1998 | Wortman |
| 5,793,456 A | 8/1998 | Broer |
| 5,816,677 A | 10/1998 | Kurematsu |
| 5,825,543 A | 10/1998 | Ouderkirk |
| 5,828,488 A | 10/1998 | Ouderkirk |
| 5,845,038 A | 12/1998 | Lundin |
| 5,867,316 A | 2/1999 | Carlson |
| 5,882,774 A | 3/1999 | Jonza |
| 5,965,247 A | 10/1999 | Jonza |
| 5,971,551 A | 10/1999 | Winston |
| 5,976,686 A | 11/1999 | Kaytor |
| 6,019,485 A | 2/2000 | Winston |
| 6,036,328 A | 3/2000 | Ohtsuki |
| 6,080,467 A | 6/2000 | Weber |
| 6,122,103 A | 9/2000 | Perkins |
| 6,157,486 A | 12/2000 | Benson, Jr. |
| 6,157,490 A | 12/2000 | Wheatley |
| 6,210,785 B1 | 4/2001 | Weber |
| 6,262,842 B1 | 7/2001 | Ouderkirk |
| 6,267,492 B1 | 7/2001 | Reid |
| 6,276,803 B1 | 8/2001 | Aoyama |
| 6,280,063 B1 | 8/2001 | Fong |
| 6,282,821 B1 | 9/2001 | Freier |
| 6,354,709 B1 | 3/2002 | Campbell |
| 6,367,941 B2 | 4/2002 | Lea |
| 6,368,699 B1 | 4/2002 | Gilbert |
| 6,454,452 B1 | 9/2002 | Sasagawa |
| 6,531,230 B1 | 3/2003 | Weber |
| 6,566,689 B2 | 5/2003 | Hoelen |
| 6,600,175 B1 | 7/2003 | Baretz |
| 6,636,283 B2 | 10/2003 | Sasagawa |
| 6,663,262 B2 | 12/2003 | Boyd |
| 6,673,425 B1 | 1/2004 | Hebrink |
| 6,738,349 B1 | 5/2004 | Cen |
| 6,762,743 B2 | 7/2004 | Yoshihara |
| 6,783,349 B2 | 8/2004 | Neavin |
| 6,788,358 B1 | 9/2004 | Kim |
| 6,809,892 B2 | 10/2004 | Toyooka |
| 6,814,456 B1 | 11/2004 | Huang |
| 6,846,089 B2 | 1/2005 | Stevenson |
| 6,893,135 B2 | 5/2005 | Wright |
| 6,895,164 B2 | 5/2005 | Saccomanno |
| 6,905,212 B2 | 6/2005 | Pate |
| 6,905,220 B2 | 6/2005 | Wortman |
| 6,917,399 B2 | 7/2005 | Pokorny |
| 6,937,303 B2 | 8/2005 | Jang |
| 6,974,229 B2 | 12/2005 | West |
| 6,975,455 B1 | 12/2005 | Kotchick |
| 7,009,343 B2 | 3/2006 | Lim |
| 7,052,168 B2 | 5/2006 | Epstein |
| 7,072,096 B2 | 7/2006 | Holman |
| 7,164,836 B2 | 1/2007 | Wright |
| 7,178,965 B2 | 2/2007 | Parker |
| 7,220,026 B2 | 5/2007 | Ko |
| 7,220,036 B2 | 5/2007 | Yi |
| 7,223,005 B2 | 5/2007 | Lamb |
| 7,229,198 B2 | 6/2007 | Sakai |
| 7,277,609 B2 | 10/2007 | Cassarly |
| 7,285,802 B2 | 10/2007 | Ouderkirk |
| 7,296,916 B2 | 11/2007 | Ouderkirk |
| 7,317,182 B2 | 1/2008 | Schultz |
| 7,320,538 B2 | 1/2008 | Ko |
| 7,329,982 B2 | 2/2008 | Conner |
| 7,364,342 B2 | 4/2008 | Parker |
| 7,416,309 B2 | 8/2008 | Ko |
| 7,436,469 B2 | 10/2008 | Gehlsen |
| 7,436,996 B2 | 10/2008 | Ben-Chorin |
| 7,446,827 B2 | 11/2008 | Ko |
| 7,448,785 B2 | 11/2008 | Suzuki |
| 7,481,563 B2 | 1/2009 | David |
| 7,513,634 B2 | 4/2009 | Chen |
| 7,525,126 B2 | 4/2009 | Leatherdale |
| 7,604,381 B2 | 10/2009 | Hebrink |
| 7,607,814 B2 | 10/2009 | Destain |
| 7,660,509 B2 | 2/2010 | Bryan |
| 7,695,180 B2 | 4/2010 | Schardt |
| 7,740,387 B2 | 6/2010 | Schultz |
| 7,773,834 B2 | 8/2010 | Ouderkirk |
| 8,393,773 B2 | 3/2013 | Lea |
| 8,469,575 B2 | 6/2013 | Weber |
| 2001/0030857 A1 | 10/2001 | Futhey |
| 2002/0060907 A1 | 5/2002 | Saccomanno |
| 2002/0070914 A1 | 6/2002 | Bruning |
| 2002/0141194 A1 | 10/2002 | Wortman |
| 2002/0159019 A1 | 10/2002 | Pokorny |
| 2002/0175632 A1 | 11/2002 | Takeguchi |
| 2003/0043567 A1 | 3/2003 | Hoelen |
| 2003/0086680 A1 | 5/2003 | Saccomanno |
| 2003/0202363 A1 | 10/2003 | Adachi |
| 2004/0061814 A1 | 4/2004 | Kim |
| 2004/0066651 A1 | 4/2004 | Harumoto |
| 2004/0119908 A1 | 6/2004 | Sakai |
| 2004/0196667 A1 | 10/2004 | Lea |
| 2004/0219338 A1 | 11/2004 | Hebrink |
| 2005/0007756 A1 | 1/2005 | Yu |
| 2005/0007758 A1 | 1/2005 | Lee |
| 2005/0063195 A1 | 3/2005 | Kawakami |
| 2005/0073825 A1 | 4/2005 | Kuo |
| 2005/0135115 A1 | 6/2005 | Lamb |
| 2005/0135117 A1 | 6/2005 | Lamb |
| 2005/0200295 A1 | 9/2005 | Lim |
| 2005/0243576 A1 | 11/2005 | Park |
| 2005/0265029 A1 | 12/2005 | Epstein |
| 2005/0265042 A1 | 12/2005 | Kim |
| 2005/0265046 A1 | 12/2005 | Liu |
| 2005/0280756 A1 | 12/2005 | Kim |
| 2005/0285133 A1 | 12/2005 | Hung |
| 2005/0286264 A1 | 12/2005 | Kim |
| 2006/0002141 A1 | 1/2006 | Ouderkirk |
| 2006/0005620 A1 | 1/2006 | Koike |
| 2006/0028817 A1 | 2/2006 | Parker |
| 2006/0082700 A1 | 4/2006 | Gehlsen |
| 2006/0103777 A1 | 5/2006 | Ko |
| 2006/0124918 A1 | 6/2006 | Miller |
| 2006/0131601 A1 | 6/2006 | Ouderkirk |
| 2006/0146562 A1 | 7/2006 | Ko |
| 2006/0146566 A1 | 7/2006 | Ko |
| 2006/0152943 A1 | 7/2006 | Ko |
| 2006/0187650 A1 | 8/2006 | Epstein |
| 2006/0193577 A1 | 8/2006 | Ouderkirk |
| 2006/0210726 A1 | 9/2006 | Jones |
| 2006/0220040 A1 | 10/2006 | Suzuki |
| 2006/0221610 A1 | 10/2006 | Chew |
| 2006/0250707 A1 | 11/2006 | Whitney |
| 2006/0257678 A1 | 11/2006 | Benson |
| 2006/0262564 A1 | 11/2006 | Baba |
| 2006/0268554 A1 | 11/2006 | Whitehead |
| 2006/0284569 A1 | 12/2006 | Wey |
| 2006/0290842 A1 | 12/2006 | Epstein |
| 2006/0290844 A1 | 12/2006 | Epstein |
| 2007/0008722 A1 | 1/2007 | Fujino |
| 2007/0024994 A1 | 2/2007 | Whitney |
| 2007/0047228 A1 | 3/2007 | Thompson |
| 2007/0047254 A1 | 3/2007 | Schardt |
| 2007/0047262 A1 | 3/2007 | Schardt |

(56) References Cited

U.S. PATENT DOCUMENTS

| | | |
|---|---|---|
| 2007/0081330 A1 | 4/2007 | Lee |
| 2007/0091641 A1 | 4/2007 | Lin |
| 2007/0092728 A1 | 4/2007 | Ouderkirk |
| 2007/0147037 A1 | 6/2007 | Wang |
| 2007/0153162 A1 | 7/2007 | Wright |
| 2007/0153384 A1 | 7/2007 | Ouderkirk |
| 2007/0153548 A1 | 7/2007 | Hamada |
| 2007/0171676 A1 | 7/2007 | Chang |
| 2007/0189032 A1 | 8/2007 | Chang |
| 2007/0223245 A1 | 9/2007 | Lee |
| 2007/0257266 A1 | 11/2007 | Leatherdale |
| 2007/0257270 A1 | 11/2007 | Lu |
| 2007/0258241 A1 | 11/2007 | Leatherdale |
| 2007/0258246 A1 | 11/2007 | Leatherdale |
| 2008/0002256 A1 | 1/2008 | Sasagawa |
| 2008/0025045 A1 | 1/2008 | Mii |
| 2008/0049419 A1 | 2/2008 | Ma |
| 2008/0057277 A1 | 3/2008 | Bluem |
| 2010/0165001 A1 | 7/2010 | Savvateev |
| 2010/0165621 A1 | 7/2010 | Hoffend |
| 2010/0165660 A1 | 7/2010 | Weber |
| 2010/0238686 A1 | 9/2010 | Weber |
| 2010/0283074 A1 | 11/2010 | Kelley |
| 2010/0302479 A1 | 12/2010 | Aronson |
| 2010/0315832 A1 | 12/2010 | Pijlman |
| 2011/0051047 A1 | 3/2011 | O'Neill |
| 2011/0075398 A1 | 3/2011 | Wheatley |
| 2011/0096529 A1 | 4/2011 | Wheatley |
| 2011/0134659 A1 | 6/2011 | Aastuen |
| 2013/0009054 A1 | 1/2013 | Venditti |

FOREIGN PATENT DOCUMENTS

| | | |
|---|---|---|
| EP | 0 650 010 | 4/1995 |
| EP | 1 070 913 | 1/2001 |
| EP | 1 376 708 | 1/2004 |
| EP | 1 333 705 | 8/2004 |
| EP | 1 640 756 | 3/2006 |
| EP | 1 837 701 | 9/2007 |
| EP | 1 942 302 | 9/2008 |
| JP | 08-153405 | 6/1996 |
| JP | 09-005737 | 1/1997 |
| JP | 10-170723 | 6/1998 |
| JP | 10-213712 | 8/1998 |
| JP | 11-039916 | 2/1999 |
| JP | 11-72625 | 3/1999 |
| JP | 11-260133 | 9/1999 |
| JP | 2002-202738 | 7/2002 |
| JP | 2003-532133 | 10/2003 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-269364 | 10/2006 |
| JP | 2006-269365 | 10/2006 |
| JP | 2008-060061 | 3/2008 |
| WO | 95/17303 | 6/1995 |
| WO | 95/17691 | 6/1995 |
| WO | WO 95/17692 | 6/1995 |
| WO | WO 95/17699 | 6/1995 |
| WO | WO 96/19347 | 6/1996 |
| WO | WO 97/01726 | 1/1997 |
| WO | WO 99/36248 | 7/1999 |
| WO | WO 99/36262 | 7/1999 |
| WO | WO 99/39224 | 8/1999 |
| WO | WO 00/43815 | 7/2000 |
| WO | WO 02/097324 | 12/2002 |
| WO | WO 2004/031818 | 4/2004 |
| WO | WO 2006/010249 | 2/2006 |
| WO | WO 2006/043344 | 4/2006 |
| WO | WO 2006/098400 | 9/2006 |
| WO | WO 2006/125174 | 11/2006 |
| WO | WO 2006/127367 | 11/2006 |
| WO | WO 2008/144644 | 11/2008 |
| WO | WO 2008/144650 | 11/2008 |
| WO | WO 2008/144656 | 11/2008 |
| WO | WO 2008/146229 | 12/2008 |
| WO | WO 2008/147753 | 12/2008 |
| WO | WO 2009/100307 | 8/2009 |
| WO | WO 2009/105450 | 8/2009 |

OTHER PUBLICATIONS

Baker et al., *Daylighting in Architecture: A European Reference Book*, pp. 4.3-4.5 1993.

Blanco et al., "Asymmetric CPC Solar Collectors with Tubular Receiver: Geometric Characteristics and Optimal Configurations", Solar Energy, vol. 37, No. 1, pp. 49-54, 1986.

Cai et al., "Reflectors for Efficient and Uniform Distribution of Radiation for Lighting and Infrared Based on Non-Imaging Optics", SPIE, vol. 1528, pp. 118-128, 1991.

Collares-Pereira et al., "High Concentration Two-Stage Optics for Parabolic Trough Solar Collectors with Tubular Absorber and Large Rim Angle", Solar Energy, vol. 47, No. 6, pp. 457-466, 1991.

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Hung et al., Novel Design for LED Lens and Backlight System, pp. 476-479, IDMC 2007 Taipei, Taiwan.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p. 9.

Thelan, Design of Optical Interference Coatings, McGraw Hill, Inc., Title Page, Table of Contents, and Preface, 5 pages, 1989.

Tripanagnostopoulos, Y. and Souliotis, M., "Intergrated collector storage solar systems with asymmetric CPC reflectors", Renewable Energy, vol. 29, pp. 223-248, www.sciencedirect.com, 2004.

Vikuiti™ Display Enhancement Brochure, Vikuiti™ Brightness Enhancement Film (BEF) II, 2 pages, Copyright © 3M IPC, 2002.

Vikuiti™ Display Enhancement Brochure, Vikuiti™ Brightness Enhancement Film-Diffuse 400 (DBEF-D400), 2 pp., Copyright ©, 2004.

Vikuiti™ Display Enhancement Brochure, Vikuiti™ Dual Brightness Enhancement Film—Diffuse 550 (DBEF-D550), 2 pages, © 3M 2004.

Weber et al., "Giant Birefringent Optics in Multilayer Polymer Mirrors", Science, vol. 287, Mar. 2000.

Winston et al., *Nonimaging Optics*, Title Page & Table of Contents, Elsevier Academic Press, Amsterdam, 2005.

THIN HOLLOW BACKLIGHTS WITH BENEFICIAL DESIGN CHARACTERISTICS

RELATED APPLICATIONS

The following U.S. patent and publications are incorporated herein by reference: U.S. Pat. No. 8,469,575; U.S. Patent Publication 2010/0238686; U.S. Patent Publication 2010/0165001; U.S. Patent Publication 2010/0165621.

FIELD

The present invention relates to extended area light sources suitable for illuminating a display or other graphic from behind, commonly referred to as backlights. The invention is particularly suited, but not necessarily limited, to backlights that emit visible light of substantially only one polarization state.

BACKGROUND

Historically, simple backlight devices included only three main components: light sources or lamps, a back reflector, and a front diffuser. Such systems are still in use for general purpose advertising signs and for indoor lighting applications.

Over recent years, refinements have been made to this basic backlight design by adding other components to increase brightness or reduce power consumption, increase uniformity, and/or reduce thickness. The refinements have been fueled by demands in the high-growth consumer electronics industry for products that incorporate liquid crystal displays (LCDs), such as computer monitors, television monitors, mobile phones, digital cameras, pocket-sized MP3 music players, personal digital assistants (PDAs), and other hand-held devices. Some of these refinements, such as the use of solid light guides to allow the design of very thin backlights, and the use of light management films such as linear prismatic films and reflective polarizing films to increase on-axis brightness, are mentioned below in connection with further background information on LCD devices.

Although some of the above-listed products can use ordinary ambient light to view the display, most include a backlight to make the display visible. In the case of LCD devices, this is because an LCD panel is not self-illuminating, and thus is usually viewed using an illumination assembly or backlight. The backlight is situated on the opposite side of the LCD panel from the viewer, such that light generated by the backlight passes through the LCD to reach the viewer. The backlight incorporates one or more light sources, such as cold cathode fluorescent lamps (CCFLs) or light emitting diodes (LEDs), and distributes light from the sources over an output area that matches the viewable area of the LCD panel. Light emitted by the backlight desirably has sufficient brightness and sufficient spatial uniformity over the output area of the backlight to provide the user with a satisfactory viewing experience of the image produced by the LCD panel.

LCD panels, because of their method of operation, utilize only one polarization state of light, and hence for LCD applications it is important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be easily eliminated by an absorbing polarizer provided at the back of the LCD panel.

LCD devices can generally be considered to fall within one of three categories, and backlights are used in two of these categories. In a first category, known as "transmission-type", the LCD panel can be viewed only with the aid of an illuminated backlight. That is, the LCD panel is configured to be viewed only "in transmission", with light from the backlight being transmitted through the LCD on its way to the viewer. In a second category, known as "reflective-type", the backlight is eliminated and replaced with a reflective material, and the LCD panel is configured to be viewed only with light sources situated on the viewer-side of the LCD. Light from an external source (e.g. ambient room light) passes from the front to the back of the LCD panel, reflects off of the reflective material, and passes again through the LCD on its way to the viewer. In a third category, known as "transflective-type", both a backlight and a partially reflective material are placed behind the LCD panel, which is configured to be viewed either in transmission if the backlight is turned on, or in reflection if the backlight is turned off and sufficient ambient light is present.

Backlights described in the detailed description below can generally be used both in transmission-type LCD displays and in transflective-type LCD displays.

Besides the three categories of LCD displays discussed above, backlights can also be considered to fall into one of two categories depending on where the internal light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

In "edge-lit" backlights, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide", particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. (Other methods of gradual extraction include using a tapered solid guide, wherein the sloping top surface causes a gradual extraction of light as the TIR angle is, on average, not reached by greater numbers of light rays as the light propagates away from the light source.) Such backlights typically also include light management films, such as a reflective material disposed behind or below the light guide, and a reflective polarizing film and prismatic BEF film(s) disposed in front of or above the light guide, to increase on-axis brightness.

In the view of Applicants, drawbacks or limitations of existing edge-lit backlights include: the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the circumference to the area of a rectangle decreases linearly (1/L) with the characteristic in-plane dimension L (e.g., length, or width, or diagonal measure of the output region of the backlight, for a given aspect ratio rectangle).

In "direct-lit" backlights, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. Because the light sources are potentially directly viewable through the output area, a strongly diffusing plate is typically mounted above the light sources to spread light over the output area, to veil the light sources from direct view. Again, light management films, such as a reflective polarizer film, and prismatic BEF film(s), can also be placed atop the diffuser plate for improved on-axis brightness and efficiency. Large area LCD applications tend to use direct-lit backlights because they are not constrained by the 1/L limitation of edge-lit backlights, and because of the weight associated with solid light guides.

In the view of Applicants, drawbacks or limitations of existing direct-lit backlights include: inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punch-through", wherein a bright spot appears in the output area above each source.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

BRIEF SUMMARY

The present application discloses, inter alia, backlights that comprise a front and back reflector that form a hollow light recycling cavity. The recycling cavity has an output area Aout and a cavity depth H. One or more light sources are disposed to emit light into the light recycling cavity. These light sources have an average plan view source separation of "SEP", and collectively have an active emitting area Aemit. The backlights are characterized by a first parameter being in a range from 0.0001 to 0.1 and a second parameter being in a range from 3 to 50, where the first parameter equals Aemit/Aout, and the second parameter equals SEP/H. The light sources may be arranged predominantly at a periphery of the output area to provide an edge-lit backlight, or arranged predominantly within the space of the output area to provide a direct-lit backlight. Backlights within the recited first and second parameter ranges can have any suitable physical size, large or small. For example, such a backlight may be on the order of an inch in lateral dimension (e.g. diagonal measure of a rectangular output area), and in such case may be one of many partitioned zones in a larger zoned backlight.

The application also discloses edge-lit backlights having a front and back reflector that form a hollow recycling cavity, and that can be relatively large regardless of their first and second parameter values. The front reflector, which is partially transmissive, provides an output area of the backlight that may be generally rectangular in shape. A diagonal measure of the rectangular shape can range from at least 12 inches (300 mm) to at least 40 inches (1 meter). The hollow cavity can advantageously reduce the mass of the backlight relative to an edge-lit backlight that uses a solid light guide.

The application also discloses backlights in which light is distributed so effectively and efficiently in transverse or lateral directions that the backlights are highly resistant to source failure and/or source-to-source color variability. The brightness uniformity over the output area of such a backlight is only modestly diminished when individual light sources within the backlight degrade, fail, or are turned off. For example, backlights are disclosed in which a number N of light sources emit light into a recycling cavity formed between a front and back reflector, with some of the emitted light passing through the front reflector to form the output area of the backlight. The number N can be at least 8, and the N light sources include a subset of M light sources that are adjacent to each other, where M is at least 10% of N, or is at least 2, or both. The backlight maintains adequate brightness uniformity over the output area both when all N light sources are energized, and when all of the M light sources are selectively turned off. Because of the excellent lateral or transverse light distribution ("light mixing") in the recycling cavity, backlights such as this are also typically less sensitive to problems associated with color variability among LED sources that are all nominally the same color, a phenomenon known as "binning".

In many cases, it is desirable to provide very high recycling cavities, wherein the front reflector has a hemispherical reflectivity for visible unpolarized light of $R^f_{hemi}$, the back reflector has a hemispherical reflectivity for visible unpolarized light of $R^b_{hemi}$, and the product $R^f_{hemi} \times R^b_{hemi}$ is at least 0.70. For example, if the back reflector has an $R^b_{hemi}$ of 98%, then the front reflector has an $R^f_{hemi}$ of 71.4%. If the front reflector is optionally fabricated to reflect and transmit different polarization states differently, it may then have a hemispherical reflectivity for visible light of a first polarization state of 98%, and a hemispherical reflectivity for visible light of a second polarization state (e.g., the useable polarization state) orthogonal to the first polarization state of 78%. In such a case the second or useable polarization state is predominantly reflected by the front reflector even though it is preferentially transmitted in comparison to the first polarization state.

It is also often desirable to ensure that the amount of light transmitted through the front reflector is substantially greater than the amount of light transmitted or otherwise lost (e.g. by absorption) by the back reflector. Thus, for example, the ratio of $(1-R^f_{hemi})/(1-R^b_{hemi})$ is at least 10.

Besides the front and back reflectors, highly reflective and low loss side reflectors are preferably provided to yield a substantially closed or sealed reflecting cavity, and losses associated with the light sources are kept to minimal levels by, for example, maintaining a very small ratio of collective source area to backlight output area. In some instances, highly reflective and low loss side reflectors can aid in the lateral and transverse transport and mixing of light in a high recycling cavity.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

DETAILED DESCRIPTION OF THE ILLUSTRATIVE EMBODIMENTS

Figure 1:
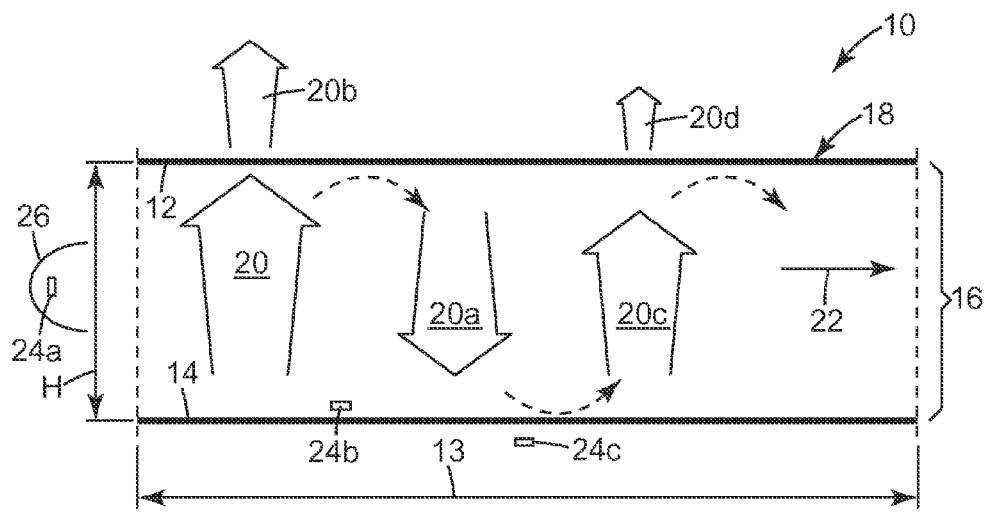
FIG. 1 is a schematic side view of a generalized recycling backlight or similar extended area source.

It would be beneficial for next generation backlights to combine some or all of the following characteristics while providing a brightness and spatial uniformity that is adequate for the intended application: thin profile; design simplicity, such as a minimal number of optical components and a minimal number of sources, and convenient source layout; low weight; no use of or need for film components having substantial spatial non-uniformities from one position in the backlight to another (e.g., no significant gradation); compatibility with LED sources, as well as other small area, high brightness sources such as solid state laser sources; insensitivity to problems associated with color variability among LED sources that are all nominally the same color, a phenomenon known as "binning"; to the extent possible, insensitivity to the burnout or other failure of a subset of LED sources; and the elimination or reduction of at least some of the limitations and drawbacks mentioned in the Background section above.

Whether these characteristics can be successfully incorporated into a backlight depends in part on the type of light source used for illuminating the backlight. CCFLs, for example, provide white light emission over their long narrow active emissive areas, and those emissive areas can also operate to scatter some light impinging on the CCFL, such as would occur in a recycling cavity. The typical emission from a CCFL however has an angular distribution that is substantially Lambertian, and this may be inefficient or otherwise undesirable in a given backlight design. Also, the emissive surface of a CCFL, although somewhat diffusely reflective, also typically has an absorptive loss that Applicants have found to be significant if a highly recycling cavity is desired.

An LED die emits light in a near-Lambertian manner, but because of its much smaller size relative to CCFLs, the LED light distribution can be readily modified e.g. with an integral encapsulant lens or reflector or extractor to make the resulting packaged LED a forward-emitter, a side-emitter, or other non-Lambertian profile. Such non-Lambertian profiles can provide important advantages for the disclosed backlights. However, the smaller size and higher intensity of LED sources relative to CCFLs can also make it more difficult to produce a spatially uniform backlight output area using LEDs. This is particularly true in cases where individual colored LEDs, such as arrangements of red/green/blue (RGB) LEDs, are used to produce white light, since failure to provide adequate lateral transport or mixing of such light can easily result in undesirable colored bands or areas. White light emitting LEDs, in which a phosphor is excited by a blue or UV-emitting LED die to produce intense white light from a small area or volume on the order of an LED die, can be used to reduce such color non-uniformity, but white LEDs currently are unable to provide LCD color gamuts as wide as those achievable with individual colored LED arrangements, and thus may not be desirable for all end-use applications.

Applicants have discovered combinations of backlight design features that are compatible with LED source illumination, and that can produce backlight designs that outperform backlights found in state-of-the-art commercially available LCD devices in at least some respects. These backlight design features include some or all of the following:

- a recycling optical cavity in which a large proportion of the light undergoes multiple reflections between substantially coextensive front and back reflectors before emerging from the front reflector, which is partially transmissive and partially reflective;
- overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area;
- a recycling optical cavity that is hollow, i.e., the lateral transport of light within the cavity occurs predominantly in air, vacuum, or the like rather than in an optically dense medium such as acrylic or glass;
- in the case of a backlight designed to emit only light in a particular (useable) polarization state, the front reflector has a high enough reflectivity for such useable light to support lateral transport or spreading, and for light ray angle randomization to achieve acceptable spatial uniformity of the backlight output, but a high enough transmission into the appropriate application-useable angles to ensure application brightness of the backlight is acceptable;
- the recycling optical cavity contains a component or components that provide the cavity with a balance of specular and diffuse characteristics, the component having sufficient specularity to support significant lateral light transport or mixing within the cavity, but also having sufficient diffusivity to substantially homogenize the angular distribution of steady state light within the cavity, even when injecting light into the cavity only over a narrow range of angles (and further, in the case of a backlight designed to emit only light in a particular (useable) polarization state, recycling within the cavity preferably includes a degree of randomization of reflected light polarization relative to the incident light polarization state, which allows a mechanism by which non-useable polarized light is converted into useable polarized light);

the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized (and further, the front reflector has a high value of hemispheric reflectivity and while also having a sufficiently high transmission of application-useable light);

light injection optics that partially collimates or confines light initially injected into the recycling cavity to propagation directions close to a transverse plane (the transverse plane being parallel to the output area of the backlight), e.g., an injection beam having an average flux deviation angle from the transverse plane in a range from 0 to 40 degrees, or 0 to 30 degrees, or 0 to 15 degrees.

Backlights for LCD panels, in their simplest form, consist of light generation surfaces such as the active emitting surfaces of LED dies or the outer layers of phosphor in a CCFL bulb, and a geometric and optical arrangement of distributing or spreading this light in such a way as to produce an extended- or large-area illumination surface or region, referred to as the backlight output area, which is spatially uniform in its emitted brightness. Generally, this process of transforming very high brightness local sources of light into a large-area uniform output surface results in a loss of light because of interactions with all of the backlight cavity surfaces, and interaction with the light-generation surfaces. Other approaches such as using direct-lit source architectures with specified LED lenses to level the incident first bounce flux on the front reflector can result in efficient, uniform brightness through the backlight output surface, but these approaches can be very sensitive to the exactly geometrical configuration of all of the backlight components. To a first approximation, any light that is not delivered by this process through the output area or surface associated with a front reflector—optionally into a desired application viewer-cone (if any), and with a particular (e.g. LCD-useable) polarization state (if any)—is "lost" light.

We propose that any backlight containing a recycling cavity can be uniquely characterized by two essential parameters. In this regard, reference is made to the generalized backlight 10 shown in FIG. 1, in which a front reflector 12 and a back reflector 14 form a recycling cavity 16. The backlight 10 emits light over an extended output area or surface 18, which in this case corresponds to an outer major surface of the front reflector 12. The front and back reflectors are shown plane and parallel to each other, and coextensive over a transverse dimension 13, which dimension also corresponds to a transverse dimension such as a length or width of the output area 18. The front reflector reflects a substantial amount of light incident upon it from within the cavity, as shown by an initial light beam 20 being reflected into a relatively strong reflected beam 20a and a relatively weaker transmitted beam 20b. Note that the arrows representing the various beams are schematic in nature, e.g., the illustrated propagation directions and angular distributions of the different beams are not intended to be completely accurate. Returning to the figure, reflected beam 20a is strongly reflected by back reflector 14 into a beam 20c. Beam 20c is partially transmitted by front reflector 12 to produce transmitted beam 20d, and partially reflected to produce another beam (not shown). The multiple reflections between the front and back reflectors help to support transverse propagation of light within the cavity, indicated by arrow 22. The totality of all transmitted beams 20b, 20d, and so on add together incoherently to provide the backlight output.

For illustrative purposes, small area light sources 24a, 24b, 24c are shown in alternative positions in the figure, where source 24a is shown in an edge-lit position and is provided with a reflective structure 26 that can help to collimate (at least partially) light from the source 24a. Sources 24b and 24c are shown in direct-lit positions, and source 24c would generally be aligned with a hole or aperture (not shown) provided in the back reflector 14 to permit light injection into the cavity 16. Reflective side surfaces (not shown, other than reflective structure 26) would typically also be provided generally at the endpoints of dimension 13, preferably connecting the front and back reflectors 12, 14 in a sealed fashion for minimum losses.

In some direct-lit embodiments, generally vertical reflective side surfaces may actually be thin partitions that separate the backlight from similar or identical neighboring backlights, where each such backlight is actually a portion of a larger zoned backlight. Light sources in the individual sub-backlights can be turned on or off in any desired combination to provide patterns of illuminated and darkened zones for the larger backlight. Such zoned backlighting can be used dynamically to improve contrast and save energy in some LCD applications. The reflective partitions between zones may not extend completely to the top reflector, but may be separated therefrom by a gap that is sized to minimize the visibility of zone boundaries (from the perspective of a viewer) while also minimizing zone-to-zone bleedthrough.

Returning to our two-parameter discussion, the first parameter, referred to herein as Parameter A, relates the total emitting source area to the backlight output area. Thus, Parameter A is the ratio of the total area of all emitting light source surfaces (referred to herein as "Aemit") to the area of the output surface of the backlight (referred to herein as "Aout"). In the usual case of a rectangular-shaped output region, the area Aout is simply the rectangle's length times its width. For a given backlight, the total area of the light source surfaces can be determined by summing the active area of the light sources. For example, a Lumileds™ LXHL-PM09 green LED, considered a "large die" LED, has a die surface area (one large top surface and four smaller side surfaces) of about 1 mm$^2$. A Nichia Rigel NFSG036B green LED, considered a "small die" LED, has a die surface area of about 0.09 mm$^2$. A backlight having an array that consists of 65 "large die" LED clusters—one red, one blue, and one green, whose outputs are balanced to produce white light when combined—would have a total light source surface area of:

$$65 \text{ clusters} \times 3 \text{ dies/cluster} \times 1 \text{ mm}^2/\text{die} = 325 \text{ mm}^2.$$

For a CCFL-based backlight, the total light-generation surface area is merely the total surface area of the light-emitting phosphor layer per bulb, times the number of bulbs illuminating the cavity. For example, a backlight containing 16 CCFL bulbs, each 820 mm long with a 4 mm diameter, would have a total light generation surface area of:

$$16 \text{ bulbs} \times (\pi \times 4 \text{ mm}) \times 820 \text{ mm} = 164{,}871 \text{ mm}^2.$$

The ratio of the cumulative light source surface area to the output surface area, i.e., Parameter A, is a normalized and unitless measure representative of a basic backlight challenge: transforming small surfaces of high brightness (and typically with a Lambertian emission pattern) into a large surface output, preferably of relatively spatially uniform brightness, and preferably where the total luminous flux from the output surface is a substantial fraction of the total luminous flux from the light sources (a fraction of 1.0 or 100% corresponding to an ideal lossless system).

Our second parameter relates the average plan-view or lateral source separation ("SEP") to the cavity depth ("H"). The cavity depth H (FIG. 1) is the physical distance from the back reflector to the front reflector along an axis perpendicular to the output area, i.e., it is the on-axis separation of the front and back reflectors. The average plan-view source separation SEP is a measure of the characteristic lateral spacing of light sources. Its computation is best explained by examples.

Figure 2A:
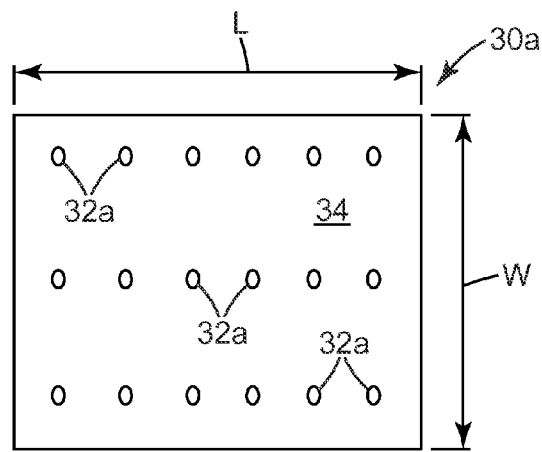
FIGS. 2a-c are top plan views of different light source arrangements within a recycling cavity.

FIG. 2a shows a schematic plan view of a light source arrangement for a direct-lit backlight 30a having eighteen light sources 32a disposed on or proximate a back reflector 34 of transverse dimensions L (length) and W (width), where the associated front reflector and output area (not shown) have the same transverse dimensions and are coextensive with the back reflector 34. The sources 32a are arranged in a regular repeating pattern to form three equally spaced rows separated along the width or y-direction and six equally spaced columns separated along the length or x-direction (perpendicular to the y-direction). The average spacing of the sources along the y-direction is thus L/6, and the average spacing of the sources along the y-direction is W/3. The SEP is then calculated as the average of these two orthogonal source spacings, or:

$$SEP=((L/6)+(W/3))/2.$$

For a 6×6 inch output area (L=W=6 inches or 153 mm), the SEP for this example becomes SEP=38 mm. Note that the result remains the same if the spacing between rows is not uniform, or if the spacing between columns is not uniform, as long as the light sources are arranged in three rows and three columns. Note also that each source 32a may be a single emitting element such as a single white-emitting LED, or it may be the smallest unit cell or cluster of individual colored LEDs (e.g., red/green/blue or red/green/blue/green, etc.) that produces the desired backlight color, which is normally white light. In the case of a backlight designed to emit light of only one color, e.g., green, each source 32a is a single green-emitting LED.

Figure 2B:
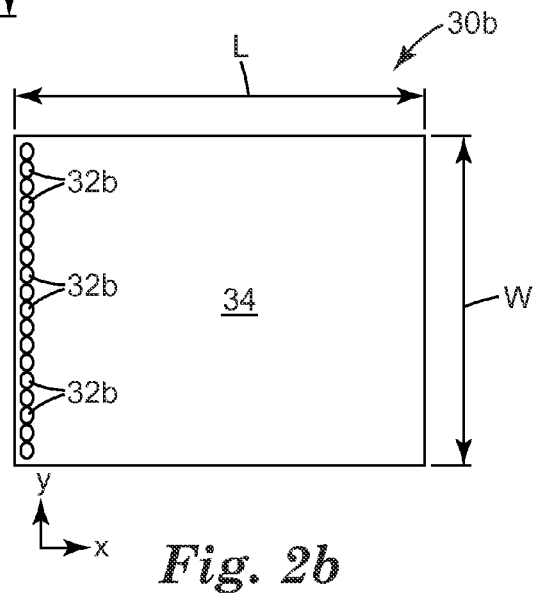

FIG. 2b shows a schematic plan view of a light source arrangement for a backlight 30b similar to backlight 30a, but where eighteen light sources 32b are disposed along a periphery of the back reflector 34 in a single line or column parallel to the y-direction. In this case there is only one column of light sources 32b along the length or x-direction, and 18 rows of (single) light sources 32b arranged along the width or y-direction. The average spacing of the sources along the x-direction is thus L/1, and the average spacing of the sources along the y-direction is W/18. The SEP is again calculated as the average of these two orthogonal source spacings, or:

$$SEP=((L/1)+(W/18))/2.$$

For a 6×6 inch output area (L=W=6 inches or 153 mm), the SEP for this example becomes SEP=81 mm. Note that the result remains the same if the spacing of the sources along the y-direction is not uniform. The SEP value of 81 mm is more than twice that of the FIG. 2a embodiment (38 mm), even though both embodiments use the same number of sources. This is as it should be, since each light source in the FIG. 2b embodiment is required to influence or illuminate a much longer lateral dimension along the output surface, than each source in FIG. 2a. SEP can be considered a transverse or lateral "radius of influence" that each source, on average, is required to provide to the output area.

In a case were there is only one light source 32a in the embodiment of FIG. 2a, or only one light source 32b in the embodiment of FIG. 2b, no matter where in relation to the output area the single light source is positioned, the average source spacing along the x-direction is L/1 and the average source spacing along the y-direction is W/1, resulting in an SEP of ((L+W)/2) or 153 mm in the case of a 6×6 inch output area.

Figure 2C:
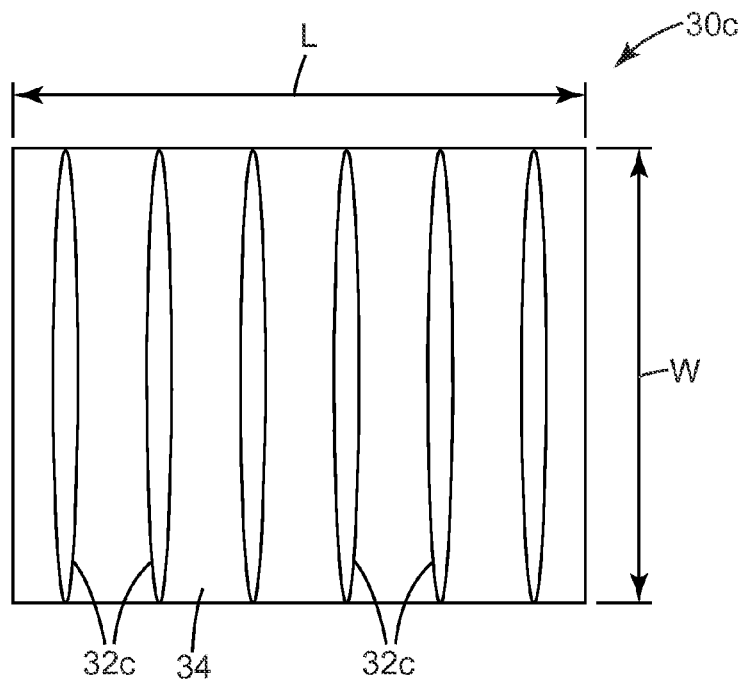

Linear-shaped light sources such as CCFLs that span substantially a full transverse dimension of the output area are treated differently than localized or "point" sources like LEDs. FIG. 2c shows a schematic plan view of a light source arrangement for a direct-lit backlight 30c similar to backlight 30a, but where six linear light sources 32c are arranged in a linear array across the same back reflector 34 as shown. In this case the average spacing of the sources along the x-direction is L/6, because there are six sources distributed along the dimension L. The average spacing along the y-direction is zero, because the light sources 32c are continuous along that direction. SEP is again calculated as the average of these two orthogonal source spacings, or:

$$SEP=((L/6)+0)/2=L/12.$$

This corresponds to half the average bulb-to-bulb spacing. For a 6×6 inch output area (L=W=6 inches or 153 mm), the SEP for this example becomes SEP=13 mm.

With this background, we can characterize any recycling cavity backlight, that has adequate brightness and spatial uniformity for its intended application, by the two dimensionless parameters:

Parameter $A=A\text{emit}/A\text{out}$; and

Figure 3:
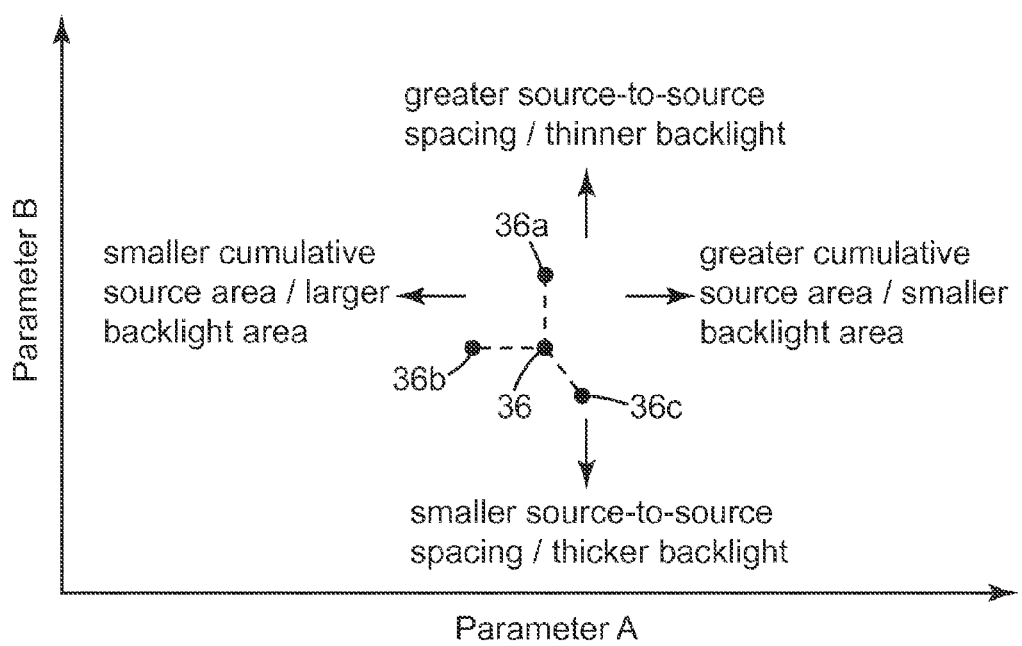
FIG. 3 is a graph of a backlight parameter design space defined by two dimensionless parameters, Parameter A and Parameter B.

Parameter $B=SEP/H$ where Aemit, Aout, SEP, and H are as described above. FIG. 3 shows a graph that plots these two parameters as a backlight parameter space or backlight design space.

This characterization is particularly straightforward for planar backlight cavities, in which the back reflector (sometimes referred to herein as a backplane) of the backlight and the output area of the backlight are both planar, parallel to each other, and of approximately equal area and approximately coextensive. Our two-parameter characterization, however, is by no means restricted to plane parallel backlight geometries, and may be generalized for any backlight geometry having the basic elements of an output surface associated with a front reflector, and a back reflector that forms a light recycling cavity with the front reflector, and a grouping of one or more light sources disposed within, or optically connected to the cavity.

FIG. 3 includes some description of general trends in the design space, which is self-explanatory. Also depicted is a point 36 representing a hypothetical initial backlight design. If the design is modified by reducing the cavity depth H but keeping all other design features constant, the modified design will correspond to a point 36a above and in vertical alignment with point 36. If the initial backlight design is instead modified by replacing each individual source in the backlight with a smaller emitting area source (e.g. replacing each LED die with a smaller LED die, but keeping the total number of LED dies constant and keeping their spatial distribution the same), but keeping all other design features constant, then the modified design will correspond to a point 36*b* to the left of and in horizontal alignment with point 36. In yet another alternative, the initial design can be modified by adding more light sources and arranging them more densely within the backlight, while keeping other design features constant. In this case the modified design will correspond to a point 36*c* that is both below and to the right of the starting point 36. One can anticipate that in the years to come, LED sources may become brighter, and this may lead one to remove light sources from the initial design and arrange them more sparsely within the backlight, keeping other design features constant. Such a design modification would correspond to a point that is both above and to the left of the starting point 36.

Several commercially available LCD devices were obtained and their backlights analyzed with regard to the backlight parameter space. The resulting design points are shown in the backlight design space graph illustrated in FIG. 4, which again plots Parameter A against Parameter B.

Points 40*a-d* all represent commercial LCD televisions that utilize direct-lit backlights powered by arrays of colored LEDs. Point 40*a* represents a Samsung Electronics 46 inch (diagonal measure) TV. Point 40*b* represents an OSRAM 32 inch Golden Dragon TV. This unit grouped the LEDs in clusters of four: RGGB. Point 40*c* represents another OSRAM 32 inch Golden Dragon TV, but this one grouped the LEDs in clusters of three: RGB. Point 40*d* represents a Sony Qualia 40 inch TV. The points 40*b-e* all have a Parameter B value of very nearly 2.

Points 40*e-f* represent displays for commercial notebook computers. These each used an edge-lit backlight configuration, CCFL sources, and solid (acrylic) light guides. Point 40*e* represents an HP 14.1 inch dv1000, for Samsung LTN140W1-101. Point 40*f* represents an AUO 15.4 inch notebook computer, type B154-EW-02.

Points 40*g* represent numerous commercial LCD televisions, each of which used a direct-lit backlight illuminated with CCFLs.

Figure 4:
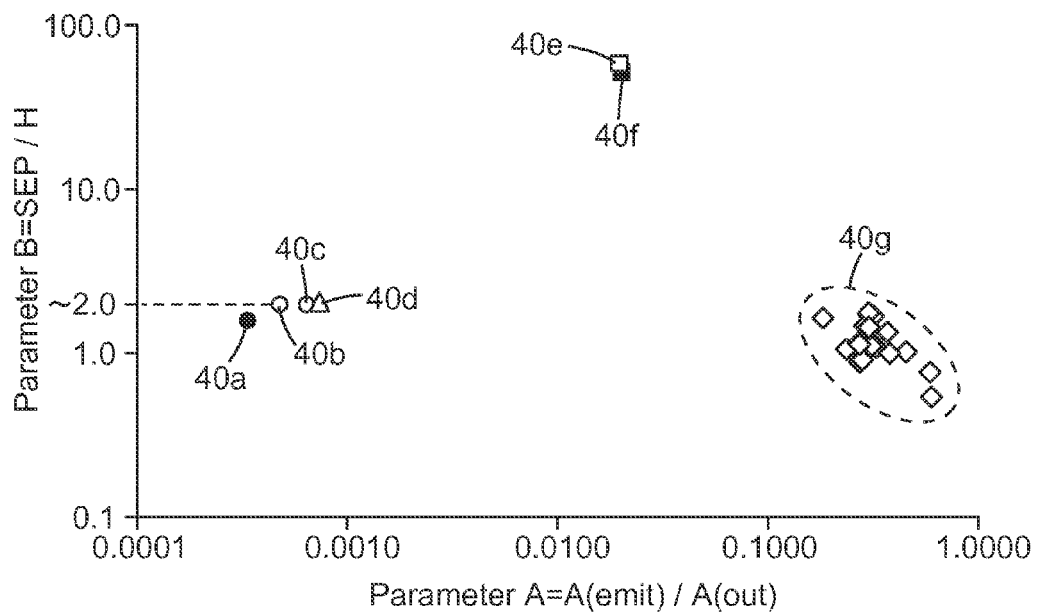
FIG. 4 is a graph of backlight parameter design space with points plotted corresponding to a variety of commercially available LCD display devices.

Reviewing the plotted points in FIG. 4, one can see that backlights having the smallest values of Parameter A (points 40*a-d*), i.e., the smallest fraction of collective source emission area to backlight output region area, have relatively low values of Parameter B. Sources that have a high value of Parameter B (points 40*e-f*), i.e., thin cavity depth in relation to the average source separation, utilize solid light guides with their accompanying disadvantages, and achieve only moderately low values of Parameter A (since they utilize CCFL sources).

It would be desirable to provide a class of backlights having thin cavities (e.g., Parameter B=3 or more), and having moderate to low or even very low relative source areas (Parameter A=0.1 or less), and having a hollow cavity rather than a solid light guide.

As mentioned already above, Applicants have discovered combinations of backlight design features that are compatible with LED source illumination, and that can produce backlight designs that outperform existing backlights in at least some respects. We will now discuss some these backlight design features in more detail, and then, with reference to backlights that have been constructed and tested, demonstrate that such backlights (utilizing hollow cavity designs) are now able to occupy a desirable space on the graph of FIG. 4.

We begin with a discussion of exemplary front and back reflectors. In this regard, reference is made generally to U.S. Pat. No. 8,469,575 referenced elsewhere.

Exemplary partial reflectors (front reflectors) we describe here, particularly, for example, the asymmetric reflective films (ARFs) described in U.S. Pat. No. 8,469,575 provide for low loss reflections and also for better control of transmission and reflection of polarized light than is possible with TIR in a solid light guide alone. Thus, in addition to improved light distribution in a lateral sense across the face of the display, the hollow light guide can also provide for improved polarization control for large systems. Significant control of transmission with angle of incidence is also possible with the preferred ARFs mentioned above. In this manner, light from the mixing cavity can be collimated to a significant degree as well as providing for a polarized light output with a single film construction.

Preferred front reflectors have a relatively high overall reflectivity, to support relatively high recycling within the cavity. We characterize this in terms of "hemispheric reflectivity", meaning the total reflectivity of a component (whether a surface, film, or collection of films) when light is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light yields the hemispheric reflectivity, $R_{hemi}$. Characterizing a reflector in terms of its $R_{hemi}$ is especially convenient for recycling cavities because light is generally incident on the internal surfaces of the cavity—whether the front reflector, back reflector, or side reflectors—at all angles. Further, unlike the reflectivity for normal incidence, $R_{hemi}$ is insensitive to, and already takes into account, the variability of reflectivity with incidence angle, which may be very significant for some components (e.g., prismatic films).

In fact, preferred front reflectors exhibit a (direction-specific) reflectivity that increases with incidence angle away from the normal (and a transmission that generally decreases with angle of incidence), at least for light incident in one plane. Such reflective properties cause the light to be preferentially transmitted out of the front reflector at angles closer to the normal, i.e., closer to the viewing axis of the backlight, and this helps to increase the perceived brightness of the display at viewing angles that are important in the display industry (at the expense of lower perceived brightness at higher viewing angles, which are usually less important). We say that the increasing reflectivity with angle behavior is "at least for light incident in one plane", because sometimes a narrow viewing angle is desired for only one viewing plane, and a wider viewing angle is desired in the orthogonal plane. An example is some LCD TV applications, where a wide viewing angle is desired for viewing in the horizontal plane, but a narrower viewing angle is specified for the vertical plane. In other cases narrow angle viewing is desirable in both orthogonal planes so as to maximize on-axis brightness.

Figure 5:
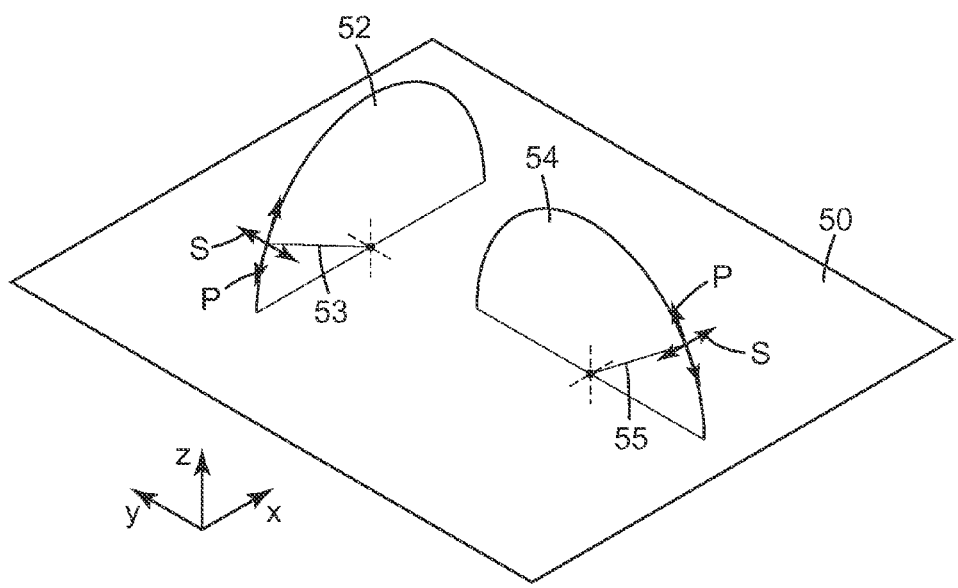
FIG. 5 is a perspective view of a surface, showing different planes of incidence and different polarization states.

When we discuss oblique angle reflectivity, it is helpful to keep in mind the geometrical considerations of FIG. 5. There, we see a surface 50 that lies in an x-y plane, with a z-axis normal direction. If the surface is a polarizing film or partially polarizing film (such as the ARFs described in U.S. Pat. No. 8,469,575), we designate for purposes of this application the y-axis as the "pass axis" and the x-axis as the "block axis". In other words, if the film is a polarizing film, normally incident light whose polarization axis is parallel to the y-axis is preferentially transmitted compared to normally incident light whose polarization axis is parallel to the x-axis. Of course, in general, the surface 50 need not be a polarizing film.

Light can be incident on surface 50 from any direction, but we concentrate on a first plane of incidence 52, parallel to the x-z plane, and a second plane of incidence 54, parallel to the y-z plane. "Plane of incidence" of course refers to a plane containing the surface normal and a particular direction of light propagation. We show in the figure one oblique light ray 53 incident in the plane 52, and another oblique light ray 55 incident in the plane 54. Assuming the light rays to be unpolarized, they will each have a polarization component that lies in their respective planes of incidence (referred to as "p-polarized" light and labeled "p" in the figure), and an orthogonal polarization component that is oriented perpendicular to the respective plane of incidence (referred to as "s-polarized light" and labeled "s" in the figure). It is important to note that for polarizing surfaces, "s" and "p" can be aligned with either the pass axis or the block axis, depending on the direction of the light ray. In the figure, the s-polarization component of ray 53, and the p-polarization component of ray 55, are aligned with the pass axis (the y-axis) and thus would be preferentially transmitted, while the opposite polarization components (p-polarization of ray 53, and s-polarization of ray 55) are aligned with the block axis.

With this in mind, let us consider the meaning of specifying (if we desire) that the front reflector "exhibit a reflectivity that generally increases with angle of incidence", in the case where the front reflector is an ARF such as is described in U.S. Pat. No. 8,469,575 referenced elsewhere. The ARF includes a multilayer construction (e.g., coextruded polymer microlayers that have been oriented under suitable conditions to produce desired refractive index relationships, and desired reflectivity characteristics) having a very high reflectivity for normally incident light in the block polarization state and a lower but still substantial reflectivity (e.g., 25 to 90%) for normally incident light in the pass polarization state. The very high reflectivity of block-state light (p-polarized component of ray 53, and s-polarized component of ray 55) generally remains very high for all incidence angles. The more interesting behavior is for the pass-state light (s-polarized component of ray 53, and p-polarized component of ray 55), since that exhibits an intermediate reflectivity at normal incidence. Oblique pass-state light in the plane of incidence 52 will exhibit an increasing reflectivity with increasing incidence angle, due to the nature of s-polarized light reflectivity (the relative amount of increase, however, will depend on the initial value of pass-state reflectivity at normal incidence). Thus, light emitted from the ARF film in a viewing plane parallel to plane 52 will be partially collimated or confined in angle. Oblique pass-state light in the other plane of incidence 54 (i.e., the p-polarized component of ray 55), however, can exhibit any of three behaviors depending on the magnitude and polarity of the z-axis refractive index difference between microlayers relative to the in-plane refractive index differences, as discussed in U.S. Pat. No. 8,469,575.

In one case, a Brewster angle exists, and the reflectivity of this light decreases with increasing incidence angle. This produces bright off-axis lobes in a viewing plane parallel to plane 54, which are usually undesirable in LCD viewing applications (although in other applications this behavior may be acceptable, and even in the case of LCD viewing applications this lobed output may be re-directed towards the viewing axis with the use of a prismatic turning film).

In another case, a Brewster angle does not exist or is very large, and the reflectivity of the p-polarized light is relatively constant with increasing incidence angle. This produces a relatively wide viewing angle in the referenced viewing plane.

In the third case, no Brewster angle exists, and the reflectivity of the p-polarized light increases significantly with incidence angle. This can produce a relatively narrow viewing angle in the referenced viewing plane, where the degree of collimation is tailored at least in part by controlling the magnitude of the z-axis refractive index difference between microlayers in the ARF.

Of course, the reflective surface 50 need not have asymmetric on-axis polarizing properties as with ARF. Symmetric multilayer reflectors, for example, can be designed to have a high reflectivity but with substantial transmission by appropriate choice of the number of microlayers, layer thickness profile, refractive indices, and so forth. In such a case the s-polarized components of both ray 53 and 55 will increase with incidence angle, in the same manner with each other. Again, this is due to the nature of s-polarized light reflectivity, but the relative amount of increase will depend on the initial value of the normal incidence reflectivity. The p-polarized components of both ray 53 and ray 55 will have the same angular behavior as each other, but this behavior can be controlled to be any of the three cases mentioned above by controlling the magnitude and polarity of the z-axis refractive index difference between microlayers relative to the in-plane refractive index differences, as discussed in U.S. Pat. No. 8,469,575.

Thus, we see that the increase in reflectivity with incidence angle (if present) in the front reflector can refer to light of a useable polarization state incident in a plane for which oblique light of the useable polarization state is p-polarized. Alternately, such increase in reflectivity can refer to the average reflectivity of unpolarized light, in any plane of incidence.

Reflective (but partially transmissive) components other than the specific ARF multilayer reflective films can also be used. Alternative candidate materials include the following:

| REFLECTOR TYPE | CONSTRUCTION | POLARIZATION |
|---|---|---|
| Multilayer | ¼ wave birefringent films, asymmetric orientation | polarizing |
|  | ¼ wave birefringent films, symmetric orientation | non-polarizing |
|  | pile of plates birefringent films, asymmetric orientation | polarizing |
|  | pile of plates films, isotropic | non-polarizing |
|  | perforated mirrors | non-polarizing |
| Metal | thin film enhanced metal films | non-polarizing |
|  | thin film enhanced metal films, perforated | non-polarizing |
|  | wire grid | polarizing |
| Diffusive | inorganic filled | non-polarizing |
|  | voided | non-polarizing |
|  | polymer blends | polarizing |
|  | birefringent fibers - concentric | polarizing |
|  | Islands-in-sea birefringent fibers | polarizing |
| Microstructured | Lenticular structures or linear prisms | non-polarizing |
|  | 2D structured surfaces (cube corner, lenslet arrays, etc.) | non-polarizing |
| Cholesteric (with retarder films) | lefthand | polarizing |
|  | righthand | polarizing |
|  | combinations of both | polarizing - adjustable |

Preferred back reflectors also have a high hemispherical reflectivity for visible light, typically, much higher than the front reflector since the front reflector is deliberately designed to be partially transmissive in order to provide the required light output of the backlight. Reference is again made to U.S. Pat. No. 8,469,575. The hemispherical reflectivity of the back reflector is referred to as $R^b_{hemi}$, while that of the front reflector is referred to as $R^f_{hemi}$. Preferably, the product $R^f_{hemi}*R^b_{hemi}$ is at least 70% (0.70), or 75%, or 80%.

Preferably, the front and/or back reflector can have a balance of specular and diffuse characteristics, thus having a semi-specular reflection characteristic as described more fully in U.S. Patent Publication 2010/0238686. Such reflectors have a transport ratio T of greater than 15% at a 15 degree incidence angle and less than 95% at a 45 degree incidence angle, where T=(F−B)/(F+B), and F and B refer to forward- and backward-scattered light flux at a specified incidence angle. Incorporation of such semi-specular reflectors into the recycling cavity can provide a desirable balance between lateral transport and angular mixing of light in the recycling cavity, for optimal output uniformity at minimal cavity thicknesses. An example of a semi-specular reflector is Vikuiti™ ESR film that has been coated with a layer of beads.

Figure 6:
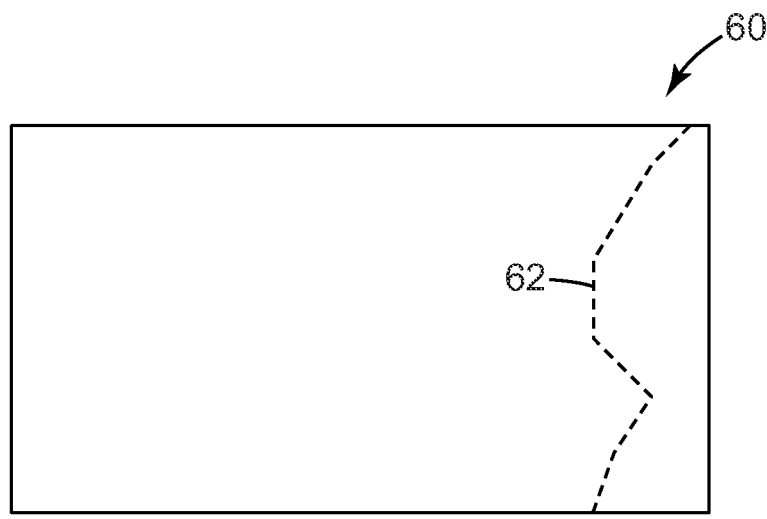
FIG. 6 is a front view of a backlight output area.

Side reflectors are also typically included in the recycling cavity to minimize loss and enhance light propagation. As mentioned elsewhere herein, the side reflectors may be partitions that divide adjacent sections of a larger zoned backlight. Furthermore, the hollow nature of the preferred recycling cavities make them readily amenable to substantial design flexibility in the design of the side reflectors. In one case, the side reflectors may simply be reflectorized walls of a cake-pan-like support unit, in a simple rectangular shape. Alternatively, the side reflectors may be strips of thin reflective film, whether alone or applied to a somewhat stiffer substrate for mechanical support. In such cases it is relatively easy to produce a cavity area that is other than rectangularly-shaped, simply by bending one or more side-reflector strips into a desired shape. This is shown in FIG. 6, where reference numeral 60 identifies a backlight output area of conventional rectangular design. An irregularly shaped side reflector 62, formed for example by bending a strip of reflective material and placing it between the (rectangular- or otherwise-shaped) front and back reflectors, produces an output area with an irregular right edge. Other edges of the output area may be similarly shaped to provide a wide variety of non-rectangular output area shapes, e.g., oval.

For illustrative purposes, it is convenient to further define the optical surfaces of the backlight front reflector and back reflector, which form the recycling cavity. In this regard, reference is made to FIG. 7, in which—for modeling purposes in which we consider the front and back reflector to be of substantially infinite extent—we can define a back reflector effective reflectivity for visible unpolarized light, "$R^b_{hemi}$ (effective)", as including all of the reflective and lossy elements within the interior of the recycling cavity, other than the aperture defining the output surface. In this regard, lossy elements such as LED dies, lenses, packaging, circuitry and exposed circuit board, are included in an area-fraction sense, with the surrounding high-reflectivity materials, to determine $R^b_{hemi}$(effective). Further, physical gaps between reflective surfaces are also included in defining this effective reflectivity. The physical location of this $R^b_{hemi}$(effective) surface can then be conveniently drawn as coincident with the mean surface of the physical cavity interior.

Further, it is convenient to define the optical properties of the front reflector using the simple constructs $R^f_{hemi}$, and $T^{useable}$(0 deg), where "useable" (sometimes illustrated with the symbol "∥") refers to the polarization state that is aligned with the pass-axis of the bottom absorbing polarizer of an application LCD panel (shown above the backlight in FIG. 7).

$R^f_{hemi}$ is a measurable quantity, describing the hemispherical reflectivity of the front reflector. This front reflector can be configured to consist of a single reflective film, or numerous combinations of reflective films or reflective elements. They may be laminated or spaced apart, but in general they are defined as components that are co-extensive with the output face of the cavity and operate together as a system to recycle light from the sources in order to thoroughly mix the light within the cavity. The components of the front reflector can include diffusive elements such as diffuser plates, and surface structure diffusers, as well as refractive elements such as lenticular and/or prismatic films.

The value of $T^{useable}$(0 deg) is defined as the ratio of the transmitted intensity at 0 degrees (normal to the front reflector plane) with the front reflector and an absorbing polarizer overlaying an all-angle light source (e.g. an angle-mixed recycling cavity), to the intensity at 0 degrees for just the absorbing polarizer overlaying the all-angle light source. In instances where the display application is designed to accept light of some other set of angles other than the normal angle, 0 degrees, or some arbitrary polarization state, the characteristic optical property of the front reflector can be more generally specified by $T^{pol}(\Omega)$, where $\Omega$ represents the solid angle of application acceptance of light from the output area of the backlight, and "pol" refers to the polarization state of that light, which is required for application utility.

Figure 7:
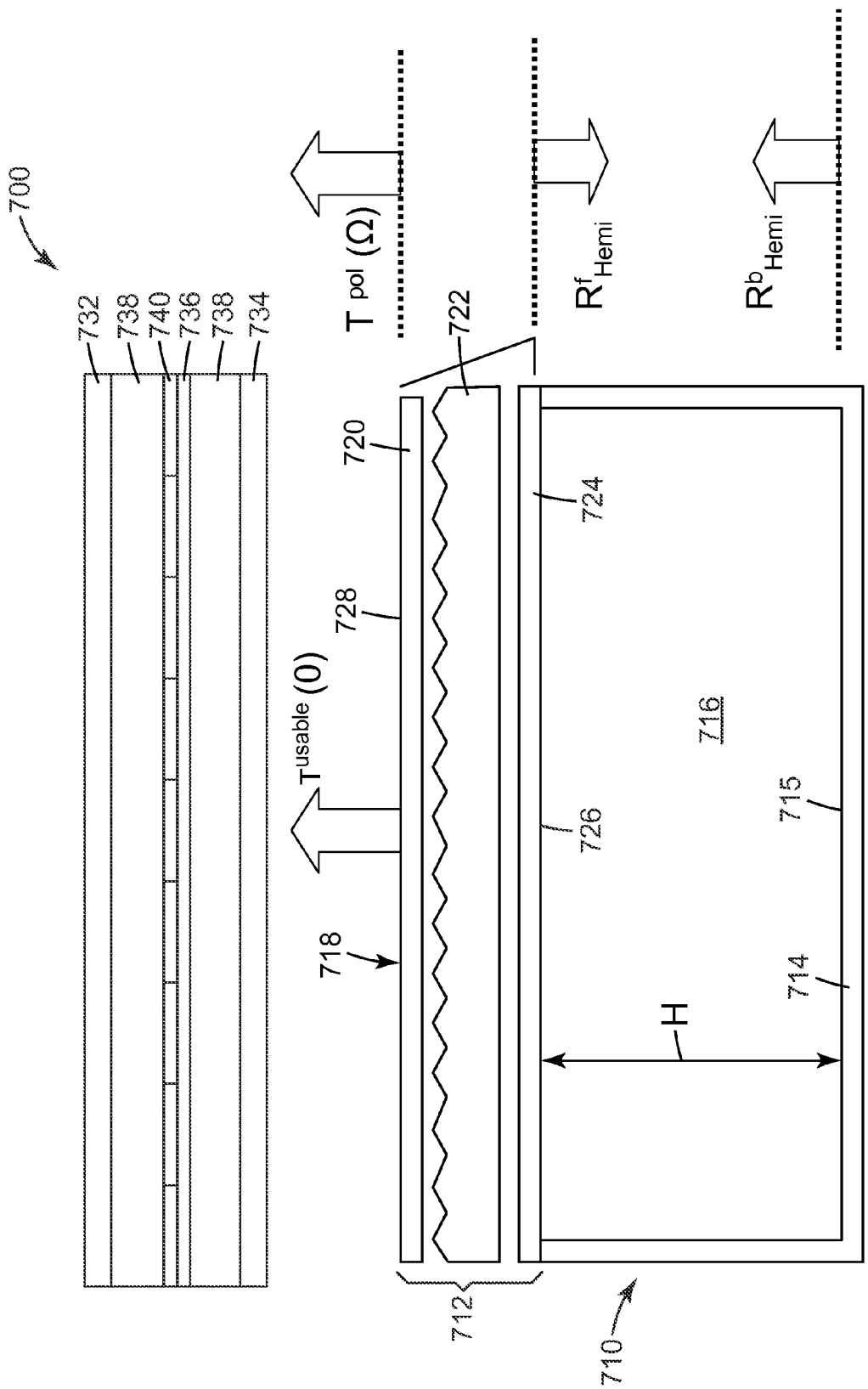
FIG. 7 is a schematic side view of a backlight in combination with an LCD panel.

In reference to FIG. 7, it is further convenient to define the front reflector as a surface with properties $R^f_{hemi}$, residing at the inner-most surface of the front reflector film, or the inner-most reflective component of the front reflector component stack, and $T^{pol}(\Omega)$, residing at the outer-most surface of the front reflector film, or the outer-most reflective component of the front reflector component stack The backlight cavity depth H, can then be defined by the perpendicular distance from the $R^b_{hemi}$(effective) surface, and the front reflector innermost surface with property $R^f_{hemi}$. For other arbitrary backlight cavity geometries, where the back reflector $R^b_{hemi}$ (effective) surface and the front reflector $R^f_{hemi}$ surface are not co-planar, an effective cavity depth $H_{eff}$ can be defined using appropriate geometrical constructs.

In many cases, it is desirable to combine high-recycling properties of a backlight cavity having a product $R^f_{hemi} \times R^b_{hemi}$(effective) of at least 0.70, and preferably at least 0.80, and most preferably at least 0.90, with sufficiently high values of $T^{pol}(\Omega)$, as this provides the angle-mixed and spatially mixed light within the cavity, an escape mechanism across the output area, for delivering spatially uniform brightness to the application.

In instances where the application requires light of a certain polarization, such as an LCD panel, sufficiently high values of $T^{useable}$(0 deg) may be needed to achieve high LCD-usable brightness, across an application viewer-cone that is distributed about the normal direction. Indeed, with the advent of new solid-state, high brightness LED light sources, the dual challenge of transforming the high-brightness LED light generation surfaces into large-area, spatially uniform output surfaces of required brightness, without the loss of significant portions of LED emitted light, has become formidable. We therefore describe herein hollow backlights with unique geometrical properties SEP/H and Aemit/Aout, that have adequate brightness and spatial uniformity for an intended application. This is achieved by the surprising approach of employing backlight cavities with very high reflective surfaces front and back, in combination with a balance of these reflective surfaces' specular and diffuse characteristics, and with light injection optics that partially collimate or confine light initially injected into the recycling cavity to propagation directions close to a transverse plane (the transverse plane being parallel to the output area of the backlight). In addition we have found that by use of unique front reflector $T^{pol}(\Omega)$ properties, high-application brightness, of application-usable polarization can be achieved.

To a good approximation, a suitable designed optical cavity in which a large proportion of the light emitted by internal light sources undergo multiple reflections between substantially coextensive front and back reflectors, will have light rays within the cavity that can become substantially randomized in both direction, and spatial location within the cavity. The number of multiple reflections required to achieve this spatial and angular randomization of the light rays will depend to a large extent on the specular and diffusive characteristics for the reflective elements. The reader is referred to U.S. Patent Publication 2010/0238686 for a more complete discussion of this topic.

For a recycling backlight cavity with a high degree of angular and spatial randomization of light rays within the cavity, the brightness through the output surface into any particular output angle $\Omega$ will be substantially equal at various points along the output surface. For such a recycling cavity, the brightness into any particular output angle $\Omega$ can be approximated by the expression:

$$L(\Omega)=(\text{Light Source Lumens})/(2\pi \times A_{out})*T^{pol}(\Omega)/(1-R^f_{hemi} \times R^b_{hemi}(\text{effective}))$$

The "Light Source Lumens" is that which is emitted into the cavity by the light sources disposed within, or optically coupled to the cavity. The expression $T^{pol}(\Omega)/(1-R^f_{hemi} \times R^b_{hemi}(\text{effective}))$ represents the fractional increase in intensity into a solid angle $\Omega$, of polarization "pol", for the recycling cavity with front and back reflectors, compared with an angle-mixed flux into the forwards hemisphere (relative to the output surface) of the light sources alone.

We have found that LED light-source attributes and light injection geometries, in combination with novel high reflection materials, with appropriate front reflector transmission characteristics, can be configured to enable substantially hollow backlights in novel regions of backlight parameter space.

Component Characterization

We have measured $R^b_{hemi}$ for several materials that have current and potential uses as back reflector components. The measurement apparatus employed was custom-built by the applicants, but is straightforward in design and operation. A commercial six inch integrating sphere manufactured by Labsphere and made of Spectralon, with three mutually orthogonal ports, is used to illuminate samples and to determine hemispherical reflectance, $R_{hemi}$, as well as normal-angle transmittance $T^{useable}(0 \text{ deg})$, for front reflector and back reflector samples. A stabilized light source illuminates the sphere through one port. A Minolta PR650 spectrophotometer is used to measure the sphere internal wall radiance through a second port. The sample is placed on the third port. Calibration of the integrating sphere wall radiance is done by using a known reflectance standard placed on the third port, with sphere-wall radiance is measured with and without the calibration standard. Measurement of $R_{hemi}$ is made by placing samples on port 3; sample hemispheric reflectance $R_{hemi}$ is obtained by taking the ratio of the sphere wall radiance with and without sample, and employing a simple integrating sphere brightness-gain algorithm. This measurement of $R_{hemi}$ is germane to recycling backlight cavity performance in that it is the all-angle input, all-angle output reflection, measured in a way much like that which occurs in an actual recycling cavity. Further, transmittance into a chosen solid angle $T(\Omega)$, where $\Omega$ is defined by the collection aperture and its location relative to the normal to the sample surface, is collected using the Minolta PR650 spectrophotometer at the third port. The LCD-usable transmittance at normal angle $T^{useable}(0 \text{ deg})$, is obtained by using the spectrophotometer at normal angle to the sample, and referencing the sample and overlaying absorbing polarizer (LCD display polarizer SR5518, from San Ritz), to the absorbing polarizer alone.

Using the above described technique, measurements of $R^b_{hemi}$ for two commercially available materials 3M Vikuiti™ ESR, and MCPET and of a two-sheet laminate of 3M TIPS (2×TIPS), and of a bead-coated version of ESR (BGD-ESR) were made and are shown in the table below:

TABLE I

| Ref letter | Material | Reflection characteristic | $R^b_{hemi}$ |
|---|---|---|---|
| A | 3M Vikuiti ESR | Specular | 99.4% |
| B | MC-PET | Near-Lambertian diffuse | 98.4% |
| C | 3M 2xTiPS | Near-Lambertian diffuse | 97.5% |
| D | 3M BGD ESR | Semi-specular | 98.0% |

Further characterizations were performed using the techniques referenced above, on the materials potentially suitable for use as front reflectors, either single reflective films or combinations of reflective elements and diffusive elements. The results of these characterizations are listed in the following table:

TABLE II

| Ref # | Material | Reflection characteristic | $R^b_{hemi}$ | $T^{useable}$ (0 deg) |
|---|---|---|---|---|
| 1 | Astra DR55 (DP) | Lambertian | 43.9% | 55.6% |
| 2 | DP + DBEF-Q | Lambertian | 62.8% | 63.1% |
| 3 | DP + ARF-37 | Lambertian | 73.2% | 50.0% |
| 4 | DP + 3xARF | Lambertian | 78.3% | 44.9% |
|  | DP + GD + BEF + DBEF | Lambertian | 75.0% | 59.0% |
| 5 | ARF-89 | Specular | 92.5% | 11.0% |
| 36 | ARF-86 + BGD (afs) | Specular | 92.1% | 12.8% |
| 47 | ARF-84 | Specular | 88.5% | 16.3% |
| 58 | ARF-84 + BGD (afs) | Specular | 88.5% | 19.8% |
| 69 | ARF-68 | Specular | 83.2% | 31.6% |
| 7 | ARF-37 | Specular | 67.6% | 61.9% |
| 8 | 3xARF | Specular | 75.4% | 52.0% |
| 9 | 4xARF | Specular | 79.2% | 44.4% |
| 10 | 5xARF | Specular | 81.1% | 39.6% |
| 11 | 5xARF + BGD (ts) | Semi-Specular | 82.1 | 38.3% |
| 12 | APF | Specular | 51.0 | 90.1% |
| 13 | DBEF-D | Semi-Specular | 47.6 | 89.6% |

The recent emergence of very small-area light sources, such as LEDs, provide an opportunity to substantially increase the reflectivity levels for a recycling backlight back reflector. Indeed, because LED emission surface areas are so small in comparison with other more conventional light sources, such as CCFLs, the vast majority of a recycling cavity back reflector surface can be composed of materials with extremely high values of $R^b_{hemi}$ such as those described in the Table I above. Of course, it is the $R^b_{hemi}$(effective) value for a recycling cavity that operationally will determine how efficient the cavity is in randomizing ray angles, and creating a spatially uniform output-surface brightness. As stated above, the $R^b_{hemi}$(effective) value will include low reflectivity elements within the recycling cavity, associated with light sources and electronics. We have characterized the effective reflectivity of a Cree X-Lamp array consisting of small packaged die RGGB LEDs, exposed circuitry, and an exposed local circuit board. The visible light reflectivity was characterized for the exposed area around and including the RGBG small die cluster, and the reflectivity was estimated at ~50% on average across the visible band. We can therefore make a reasonable assumption that $R^{LED\text{-}area}_{hemi}=\sim 50\%$.

Figure 8:
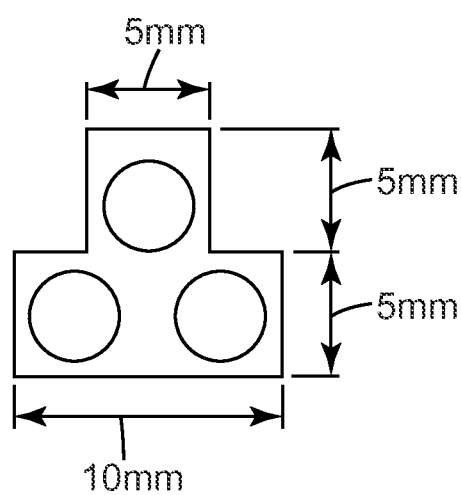
FIG. 8 is a plan view of an LED cluster arrangement.
Figure 9:
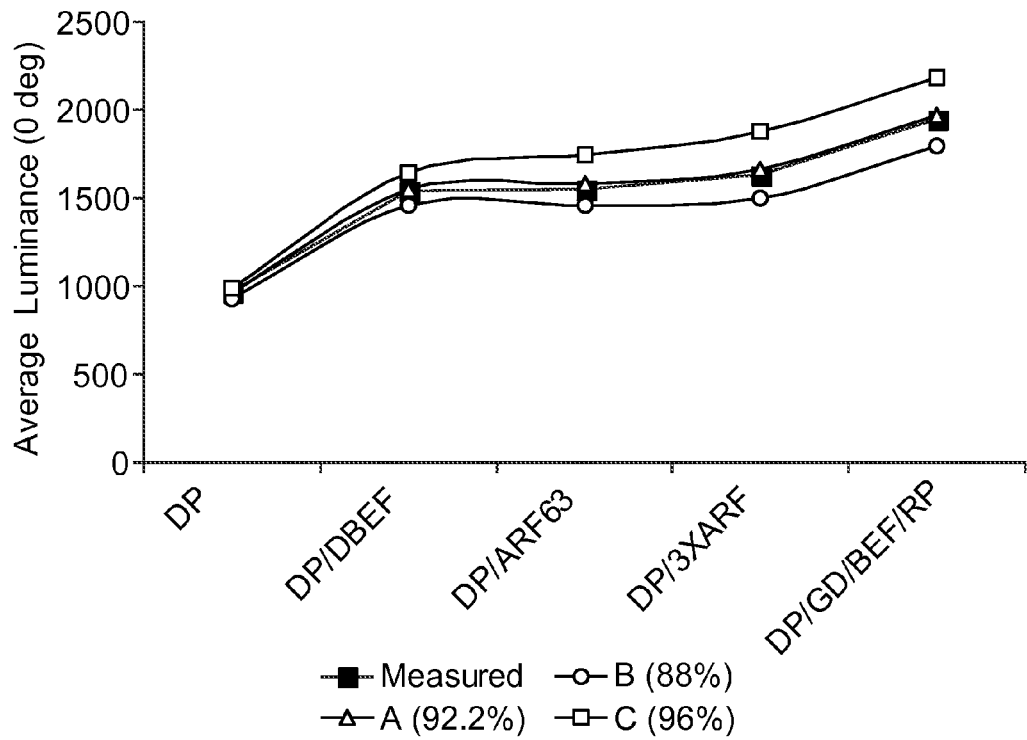
FIG. 9 is a graph showing average luminance for different reflectors and different "effective reflectivities" of the back reflector.

In the "Direct-Lit Low-Power Backlight" examples described in U.S. Pat. No. 8,469,575 referenced elsewhere, the 66 clusters of RGB small package die were arrayed on the rectangular back surface of the recycling cavity, with 3M 2×TIPS covering the majority of the back reflector surface, and specular 3M ESR covering the rectangular box sidewalls. FIG. 8 depicts a top view of an individual such cluster, with dimensions given in millimeters. Careful inspection of the geometrical arrangement of the 66 RGB die clusters, and the neighboring high reflectivity 2×TIPS material, indicated that the exposed area of material associated with the LED packaging and circuitry, was ~11.2% of the back reflector area, with the remaining 88.8% of the area covered by 2×TIPS. A simple area-fraction average of the $R_{hemi}$ for each of the components, yields a value for $R^b_{hemi}$(effective)=92.2%. This value for the recycling backlight's $R^b_{hemi}$(effective) can be validated by using the measured values shown in Table II, for the front reflectors described in Examples C6, C7, C8, 27, and 28 (these designations are used in U.S. Pat. No. 8,469,575) referenced elsewhere, where a complete description of the examples can be found), and applying these measured values of $T^{useable}$(0 deg) and $R^f_{hemi}$ to the equation for LP) above. In this instance, the LED RGB cluster luminous output was assumed to be 3.55 lumens/cluster. FIG. 9 is referenced as indicating that the measured average luminance (0 deg) for each of the front reflectors types in the Examples C6, C7, C8, 27, and 28, compares well with the assumption of $R^b_{hemi}$(effective)=92.2%, as compared with other values for $R^b_{hemi}$(effective), indicating that the calculation of $R^b_{hemi}$(effective) by area-fraction weighing of the back reflector $R^b_{hemi}$ components, is valid. FIG. 9 also demonstrates the great and surprising impact that small changes in cavity efficiency (represented by the value of $R^b_{hemi}$(effective)) can have on backlight brightness.

Other recycling backlight designs that take advantage of further reductions in the low-reflectivity material area-fraction of the back reflector, can be quite advantageous in providing significant improvements in light ray angular and spatial mixing, with lower losses of light to the application through the front output surface. This is particularly the case for recycling backlight architectures that employ large-package LED dies, in which die sizes are on the order of 1 mm-sq. In such an instance, the area-fraction of low reflectivity material associated with LED light source disposition within or along the perimeter of the recycling cavity, can be significantly diminished. Depending on the choice of back reflector components, the value of $R^b_{hemi}$(effective) can exceed 96%, and preferably 97% and more preferably 98%.

Preface to Examples

Uniformity

A wide assortment of backlights were constructed and tested as provided further below. In most cases, both the average brightness and an indication of uniformity of each backlight is provided. These results are provided so that one can assess, at least to some extent, whether the given backlight may be suitable for any particular intended application, and not necessarily limited to applications for LCD TVs or similar end-use devices.

As used herein, therefore, the term "acceptable spatial uniformity" refers to both acceptable uniformity of both overall intensity and color. What is considered acceptable brightness and spatial uniformity depends upon the particular application for which the backlight will be used. For example, a common reference standard for LCD uniformity is TCO 05 (The Swedish Confederation of Professional Employees, version 2.0, 2005-09-21, p. 9), which specifies an acceptance threshold luminance ratio of greater than 66%. In the early commercialization of a particular technology, uniformity standards may be lower; for example, when notebook computers were first introduced, acceptable uniformity was in the range of 50-60%. Further, for example, internally illuminated channel letters are another application where luminance uniformity is an important performance metric. Here, human factor studies have shown that most people judge channel letter uniformity as being acceptable if the luminance ratio is greater than 50%. See, e.g., Freyssinier et al., *Evaluation of light emitting diodes for signage applications*, Third International Conference of Solid State Lighting, Proceedings of SPIE 5187:309-317. Emergency signage is yet another ubiquitous application for light emitting panels. An example specification for uniformity is the Energy Star program for Exit Signs. See Energy Star Program Requirements for Exit Signs Draft 1, Eligibility Criteria Version 3.0. For an exit sign to qualify for Energy Star designation, the sign should have a luminance uniformity of greater than 20:1 (i.e., 5%).

The Video Electronics Standards Association (VESA) sets guidelines for luminance and color uniformity in their publication *Flat Panel Display Measurements Standard*, v. 2.0 (published Jun. 1, 2001) standard 306-1 Sampled Uniformity and Color of White (herein referred to as VESA 9pt Color Nonuniformity Standard). The VESA 9pt Luminance Uniformity reported herein is determined from 9 specified circular regions (referred to as "sample points") on the output surface of the backlight as $$\text{VESA 9 pt Luminance Uniformity} = \frac{L_{min}}{L_{max}}$$

where $L_{min}$ is the minimum value of the luminance of the 9 points and $L_{max}$ is the maximum value of the luminance of the 9 points. Higher values of VESA 9pt Luminance Uniformity indicate systems that are more uniform.

The VESA 9pt Color Nonuniformity is determined as the largest value of the color difference between any two pairs of the 9 sample points. The color difference $\Delta u'v'$ is $$\Delta u'v' = \sqrt{(u_1' - u_2')^2 + (v_1' - v_2')^2}$$

where the subscripts 1 and 2 denote the two sample points being compared. The Color Nonuniformity determined in this manner is equal to the diameter of the smallest circle that would enclose the colors of all of the sampled points when plotted on a Cartesian graph of v' vs. u'. Lower values of VESA 9pt Color Nonuniformity indicate systems that are more uniform.

Backlight Examples

A wide assortment of backlights were constructed and tested. The details of construction (including backlight geometry, reflective materials and other optical materials used, light sources used and their configuration, and other significant backlight components), test methodology, and results are provided in U.S. Pat. No. 8,469,575, and all such information is incorporated herein in its entirety. That application uses the following designation for the various embodiments constructed, and this designation is followed in the present application:

C1, C2, C3, C4, C5, C6, C7, C8; and
1, 2, 3, 4, 5, 6a through 6f, 7, 8, 9, 10a, 10b, 11a, 11b, 12a through 12f, and 13 through 31.

As will be shown below, the examples provide numerous illustrations of hollow light-recycling cavities that reside in the desired cavity design space discussed above, and providing at least adequate brightness and uniformity characteristics. Further, the examples demonstrate the effect of different combinations of reflective films for the front and back reflectors. Different light source arrangements are also included, with some being edge- and others direct-lit type. Large-area edge-lit backlights (ranging at least from 12 to 40 inch diagonal measure) are also included. Some of the examples demonstrate the effect of turning off selected light sources, showing in some cases the robustness of the design to light source failure or burnout. Finally, the examples in various combinations are submitted to demonstrate the properties called out in the claims below.

Additional Examples 21a Through 21h

Some additional examples were carried out as follows. These additional examples used the same physical layout as Examples 20 and 21, except that in some cases the ARF-89 film used as the front reflector was replaced with 3M APF reflective polarizing film, and various combinations of light sources were turned on or off to demonstrate sensitivity to light source burnout. We refer to these additional examples as Examples 21a, b, c, d, e, f.

The backlight system from Examples 20 and 21 was used for these examples with the only difference being that one of the green LEDs was turned off. The green LED that was off was located at the left side of the left bank of LEDs when the box was viewed from the output side with the LED bar located along the top.

Example 21a the output region of the Edge-Lit, Hollow Backlight was covered by a reflective polarizer (APF mounted on an acrylic plate) which was placed over the output area of the backlight. All of the LEDs (red, green, and blue, except for the single green LED mentioned above, for a total of 4R 7G 4B) were turned on to produce white light. The backlight was bright close to the LEDs and visibly darker at the far end (away from the LEDs).

Example 21b the same configuration as for Example 21a was used, but only the green LEDs were powered (except for the single green LED mentioned above, for a total of 7G). The backlight appeared much brighter close to the LEDs and darker at the far end (away from the LEDs).

Example 21c the same configuration as for Example 21a was used, but only the four green LEDs of the right bank of LEDs were powered (for a total of 4G). The backlight appeared much brighter on the right side close to the LEDs and was darker at the far end (away from the LEDs) and also darker on the left side where the LEDs weren't lit.

Example 21d the same configuration as for Example 21a was used, but only the three green LEDs of the left bank of LEDs were powered (for a total of 3G). The backlight appeared much brighter on the left side close to the LEDs and was darker at the far end (away from the LEDs) and also darker on the right side where the LEDs weren't lit.

Example 21e the output region of the Edge-Lit, Hollow Backlight was covered by a partial reflector (ARF-89 mounted on an acrylic plate) which was placed over the output area of the backlight. The partial reflector had a pass-axis transmission of approximately 11% for visible light. The back of the backlight was covered with Bead-coated ESR. All of the LEDs were turned on (red, green, and blue, except for the single green LED mentioned above, for a total of 4R 7G 4B) to produce white light. The backlight appeared uniformly illuminated.

Example 21f the same configuration as for Example 21e was used, except only the green LEDs were powered (except for the single green LED mentioned above, for a total of 7G). The backlight appeared uniformly illuminated.

Example 21g the same configuration as for Example 21e was used, except that only the four green LEDs of the right bank of LEDs were powered (for a total of 4G). The backlight appeared uniformly illuminated.

Example 21h the same configuration as for Example 21e was used, except that only the three green LEDs of the left bank of LEDs were powered. The backlight appeared uniformly illuminated.

The measurement results for these examples are summarized below:

| Example | Y_avg | Y_std | Y_Uniformity [VESA9] |
|---|---|---|---|
| 21a | 3206 | 26.8% | 52.8% |
| 21b | 1953 | 26.3% | 52.8% |
| 21c | 1107 | 32.3% | 39.7% |
| 21d | 853 | 33.5% | 40.4% |
| 21e | 2788 | 7.8% | 91.0% |
| 21f | 1748 | 8.2% | 86.6% |
| 21g | 998 | 9.1% | 78.7% |
| 21h | 768 | 9.2% | 80.6% |

From all of the foregoing examples, we have sufficient information to calculate the backlight design parameters—Parameter A, equal to Aemit/Aout, and Parameter B, equal to SEP/H.

Figure 10:
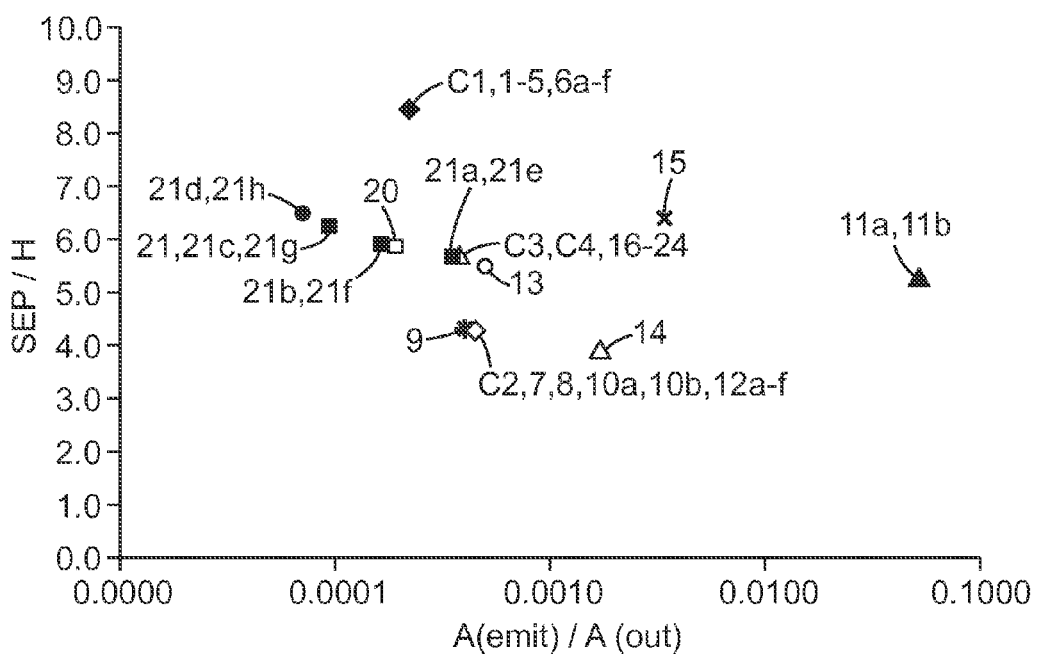
FIGS. 10 and 11 are graphs that plot the various backlight examples in the Parameter A/Parameter B design space, with FIG. 10 plotting edge-lit backlights and FIG. 11 plotting direct-lit backlights.
Figure 11:
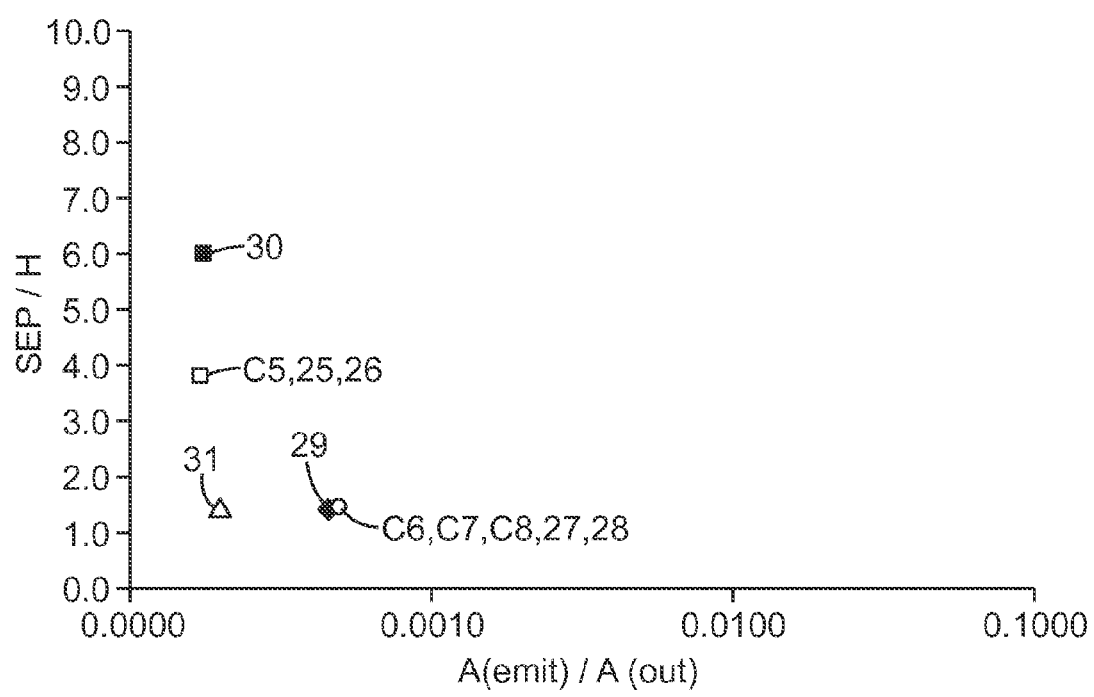

The edge-lit examples are plotted in FIG. 10, and the direct-lit examples are plotted in FIG. 11. In both cases, the labels used in the figures correspond to the Example numbering convention above.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g. home or office) or outdoor use, sometimes referred to as "luminaires". Note also that edge-lit devices can be configured to emit light out of both opposed major surfaces—i.e., both out of the "front reflector" and "back reflector" referred to above—in which case both the front and back reflectors are partially transmissive. Such a device can illuminate two independent LCD panels or other graphic members placed on opposite sides of the backlight. In that case the front and back reflectors may be of the same or similar construction.

The term "LED" refers to a diode that emits light, whether visible, ultraviolet, or infrared. It includes incoherent encased or encapsulated semiconductor devices marketed as "LEDs", whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. An LED may also include a cup-shaped reflector or other reflective substrate, encapsulating material formed into a simple dome-shaped lens or any other known shape or structure, extractor(s), and other packaging elements, which elements may be used to produce a forward-emitting, side-emitting, or other desired light output distribution.

Unless otherwise indicated, references to LEDs are also intended to apply to other sources capable of emitting bright light, whether colored or white, and whether polarized or unpolarized, in a small emitting area. Examples include semiconductor laser devices, and sources that utilize solid state laser pumping.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Various modifications and alterations of this invention will be apparent to those skilled in the art without departing from the scope and spirit of this invention, and it should be understood that this invention is not limited to the illustrative embodiments set forth herein. All U.S. patents, patent application publications, unpublished patent applications, and other patent and non-patent documents referred to herein are incorporated by reference in their entireties, except to the extent any subject matter therein directly contradicts the foregoing disclosure.

What is claimed is:

1. An edge-lit backlight, comprising:
   a front and back reflector forming a hollow light recycling cavity having a cavity depth H and an output region of area Aout; and
   one or more light sources disposed proximate a periphery of the backlight to emit light into the light recycling cavity, the light sources having an average plan view source separation of SEP and collectively having an active emitting area Aemit;
   wherein a first parameter equals Aemit/Aout;
   wherein a second parameter equals SEP/H;
   wherein the backlight is characterized by the first parameter being in a range from 0.0001 to 0.1, and by the second parameter being in a range from 3 to 10; and
   wherein the front reflector has a hemispherical reflectivity for unpolarized visible light of $R^f_{hemi}$, and the back reflector has a hemispherical reflectivity for unpolarized visible light of $R^b_{hemi}$, and $(1-R^f_{hemi})/(1-R^b_{hemi})$ is at least 10.

2. The backlight of claim 1, wherein the one or more light sources comprise one or more LEDs.

3. The backlight of claim 1, wherein $R^f_{hemi}*R^b_{hemi}$ is at least 0.70.

4. The backlight of claim 3, wherein $R^f_{hemi}*R^b_{hemi}$ is at least 0.80.

5. The backlight of claim 1, wherein the backlight exhibits a VESA 9 uniformity value of at least 50% over the output region.

6. The backlight of claim 5, wherein the backlight exhibits a VESA 9 uniformity value of at least 60%.

7. The backlight of claim 6, wherein the backlight exhibits a VESA 9 uniformity value of at least 70%.

8. The backlight of claim 7, wherein the backlight exhibits a VESA 9 uniformity value of at least 80%.

9. The backlight of claim 1, wherein the output region is generally rectangular and has a diagonal measure of at least 12 inches.

10. The backlight of claim 9, wherein the diagonal measure is at least 23 inches.

11. The backlight of claim 10, wherein the diagonal measure is at least 40 inches.

12. A backlight, comprising:
    a front and back reflector forming a hollow light recycling cavity having an output region; and
    a number N of light sources disposed to emit light into the light recycling cavity, the N light sources including a subset of M light sources that are adjacent to each other, where M is at least 10% of N, or is at least 2, or both;
    wherein the backlight exhibits a VESA brightness uniformity value over its output region of at least 50% both when all N light sources are energized and when all of the M light sources are selectively turned off; wherein the front reflector has a hemispherical reflectivity for unpolarized visible light of $R^f_{hemi}$, and the back reflector has a hemispherical reflectivity for unpolarized visible light of $R^b_{hemi}$, and $(1-R^f_{hemi})/(1-R^b_{hemi})$ is at least 10.

13. The backlight of claim 12, wherein $R^f_{hemi}*R^b_{hemi}$ is at least 0.70.

14. The backlight of claim 13, wherein $R^f_{hemi}*R^b_{hemi}$ is at least 0.80.

15. The backlight of claim 12, wherein the recycling cavity has a depth H;
    wherein the output region has an area Aout;
    wherein the N light sources have an average plan view source separation of SEP and collectively have an active emitting area Aemit;

wherein a first parameter equals Aemit/Aout;
wherein a second parameter equals SEP/H; and
wherein the backlight is characterized by the first parameter being in a range from 0.0001 to 0.1, and by the second parameter being in a range from 3 to 10.

16. The backlight of claim 12, wherein the front and back reflectors are each substantially spatially uniform.

17. The backlight of claim 12, wherein the N light sources are predominantly disposed proximate a periphery of the output region to provide an edge-lit backlight.

* * * * *

UNITED STATES PATENT AND TRADEMARK OFFICE
CERTIFICATE OF CORRECTION

PATENT NO. : 8,926,159 B2  
APPLICATION NO. : 13/938016  
DATED : January 6, 2015  
INVENTOR(S) : Nevitt et al.

Page 1 of 1

It is certified that error appears in the above-identified patent and that said Letters Patent is hereby corrected as shown below:

On the title page

Page 3, item [56] Column 2,
Line 33, delete ""Intergrated" and insert -- "Integrated --, therefor.

In the specification

Column 10,
Line 6, delete "were" and insert -- where --, therefor.

Column 11,
Line 58, after "some" insert -- of --.

Column 19,
Line 2, delete "RGBG" and insert -- RGGB --, therefor.
Line 28, delete "LP)" and insert -- $L(\Omega)$ --, therefor.

Signed and Sealed this
Fifteenth Day of March, 2016

Michelle K. Lee
*Director of the United States Patent and Trademark Office*